(12) United States Patent
Talati et al.

(10) Patent No.: US 8,126,267 B2
(45) Date of Patent: Feb. 28, 2012

(54) METHODS AND APPARATUSES FOR ANALYZING DIGITAL IMAGES TO AUTOMATICALLY SELECT REGIONS OF INTEREST THEREOF

(75) Inventors: Ronak Talati, Vestel, NY (US); Margarida Barroso, Clifton Park, NY (US)

(73) Assignee: Albany Medical College, Albany, NY (US)

( * ) Notice: Subject to any disclaimer, the term of this patent is extended or adjusted under 35 U.S.C. 154(b) by 1280 days.

(21) Appl. No.: 11/769,036

(22) Filed: Jun. 27, 2007

(65) Prior Publication Data
US 2008/0187241 A1 Aug. 7, 2008

Related U.S. Application Data

(60) Provisional application No. 60/888,151, filed on Feb. 5, 2007.

(51) Int. Cl.
G06K 9/38 (2006.01)
(52) U.S. Cl. ........ 382/172; 382/144; 382/145; 382/205; 382/272; 382/274; 382/221
(58) Field of Classification Search .......... 382/144–145, 382/172, 205, 272, 274, 221
See application file for complete search history.

(56) References Cited

U.S. PATENT DOCUMENTS
4,903,317 A * 2/1990 Nishihara et al. ............. 382/244
(Continued)

FOREIGN PATENT DOCUMENTS
WO WO 2006082979 A1 * 8/2006
(Continued)

OTHER PUBLICATIONS

Issues in confocal—analysis, Wallrabe et al., NPLreference 1., MRANDT 69, 2006, pp. 196-206.*

(Continued)

*Primary Examiner* — Jayesh A Patel
(74) *Attorney, Agent, or Firm* — Kevin P. Radigan, Esq.; Heslin Rothenberg Farley & Mesiti P.C.

(57) ABSTRACT

Computer-implemented image processing methods and apparatuses are presented for automatically selecting regions of interest within an image represented by pixel intensity values. A first pixel box is employed in progressively scanning and evaluating the image. If pixels within the first pixel box have pixel-intensity-related characteristics exceeding respective defined thresholds, then those pixels are identified as an area of interest and a second pixel box is employed in progressively scanning and evaluating the selected area of interest to identify regions of interest. Each area of interest is larger than a region of interest, and the second pixel box is smaller than the first. Regions of interest within the image are identified if one or more pixel-intensity-related characteristics of pixels within the second pixel box exceeds a second defined threshold, wherein the second threshold is greater than the first. Once selected, identifying information for the regions of interest is stored or output.

7 Claims, 14 Drawing Sheets

U.S. PATENT DOCUMENTS

| | | | |
|---|---|---|---|
| 4,922,915 A | | 5/1990 | Arnold et al. |
| 5,282,255 A | | 1/1994 | Bovik et al. |
| 5,343,390 A | * | 8/1994 | Doi et al. ............... 382/132 |
| 5,361,307 A | | 11/1994 | Hartley et al. |
| 5,797,396 A | | 8/1998 | Geiser et al. |
| 5,987,158 A | | 11/1999 | Meyer et al. |
| 5,991,699 A | * | 11/1999 | Kulkarni et al. ............... 702/83 |
| 6,021,213 A | | 2/2000 | Helterbrand et al. |
| 6,215,892 B1 | | 4/2001 | Douglass et al. |
| 6,272,235 B1 | * | 8/2001 | Bacus et al. ............... 382/133 |
| 6,335,980 B1 | * | 1/2002 | Armato et al. ............... 382/132 |
| 6,456,734 B1 | | 9/2002 | Youvan et al. |
| 6,466,687 B1 | | 10/2002 | Uppaluri et al. |
| 6,614,925 B2 | | 9/2003 | DeYong et al. |
| 6,661,909 B2 | | 12/2003 | Youvan et al. |
| 6,674,885 B2 | * | 1/2004 | Hansen et al. ............... 382/133 |
| 6,738,502 B1 | | 5/2004 | Coleman et al. |
| 6,771,819 B2 | | 8/2004 | DeYong et al. |
| 6,834,122 B2 | | 12/2004 | Yang et al. |
| 6,882,755 B2 | * | 4/2005 | Silverstein et al. ........... 382/282 |
| 6,993,169 B2 | | 1/2006 | Wetzel et al. |
| 7,162,095 B2 | * | 1/2007 | Chen et al. ............... 382/240 |
| 7,218,763 B2 | * | 5/2007 | Belykh et al. ............... 382/128 |
| 7,298,870 B2 | * | 11/2007 | Ikeda et al. ............... 382/108 |
| 7,792,372 B2 | * | 9/2010 | Ryu ............... 382/232 |
| 2001/0036304 A1 | | 11/2001 | Yang et al. |
| 2002/0057823 A1 | * | 5/2002 | Sharma et al. ............... 382/100 |
| 2002/0118870 A1 | | 8/2002 | Youvan et al. |
| 2002/0172412 A1 | * | 11/2002 | Jun et al. ............... 382/149 |
| 2003/0161522 A1 | | 8/2003 | Campanini et al. |
| 2004/0170308 A1 | * | 9/2004 | Belykh et al. ............... 382/128 |
| 2004/0175034 A1 | | 9/2004 | Wiemker et al. |
| 2004/0184647 A1 | * | 9/2004 | Reeves et al. ............... 382/131 |
| 2005/0048539 A1 | | 3/2005 | Hyman et al. |
| 2005/0048555 A1 | | 3/2005 | Holmes et al. |
| 2005/0114801 A1 | | 5/2005 | Yang et al. |
| 2006/0013491 A1 | | 1/2006 | Hecht et al. |
| 2006/0269130 A1 | | 11/2006 | Maroy et al. |
| 2007/0201749 A1 | * | 8/2007 | Yamauchi et al. ............ 382/225 |

FOREIGN PATENT DOCUMENTS

| | | | |
|---|---|---|---|
| WO | WO2006082979 | * | 10/2006 |

OTHER PUBLICATIONS

Wallrabe et al., "Issues in Confocal Microscopy for Quantitive FRET Analysis", Microscopy Research and Technique, vol. 69, pp. 196-206 (2006).

Wallrabe et al., "One- and Two-Photon Fluorescence Resonance Energy Transfer Microscopy to Establish a Clustered Distribution of Receptor-Ligand Complexes in Endocytic Membranes", Journal of Biomedical Optics, vol. 8, No. 3, pp. 339-346 (Jul. 2003).

Wallrabe et al., "Confocal Fluorescence Resonance Energy Transfer (FRET) Microscopy to Measure Clustering of Receptor-Ligand Complexes in Endocytic Membranes", Biophysical Journal, vol. 85, pp. 559-571 (2003).

Elangovan et al., "Characterization of One- and Two-Photon Excitation Fluorescence Resonance Energy Transfer Microscopy", Methods, vol. 29, pp. 58-73 (2003).

Bastiaens et al. "Microscopic Imaging Tracks the Intracellular Processing of a Signal Transduction Protein: Fluorescent-Labeled Protein Kinase CβI". Proceedings of the National Academy of Science of the Unites States of America, Aug. 1996, vol. 93 pp. 8407-9412.

Gordon et al. "Quantitative Fluorescence Resonance Energy Transfer Measurements Using Fluorescence Microscopy". Biophysical Journal, May 1998, vol. 74 pp. 2702-2713.

Wouters et al. "FRET Microscopy Demonstrates Molecular Association of Non-Specific Lipid Transfer Protein (nsL-TP) with Fatty Acid Oxidation Enzymes in Peroxisomes". The European Molecular Biology Organization Journal, 1998, vol. 17, No. 24 pp. 7179-7189.

Xia et al. "Reliable and Global Measurement of Fluorescence Resonance Energy Transfer Using Fluorescence Microscopes". Biophysical Journal, Oct. 2001, vol. 81 pp. 2395-2402.

Elangovan et al. "Characterization of One- and Two-Photon Excitation Fluorescence Resonance Energy Transfer Microscopy". Methods, 2003, vol. 29 No. 1 pp. 58-73, San Diego.

Chamberlain et al. "Imaging Spatiotemporal Dynamics of Rac Activation in Vivo with FLAIR". Methods in Enzymology, 2000, vol. 325 pp. 389-400.

* cited by examiner

METHODS AND APPARATUSES FOR ANALYZING DIGITAL IMAGES TO AUTOMATICALLY SELECT REGIONS OF INTEREST THEREOF

PRIORITY INFORMATION

This application derives priority from U.S. Provisional Application Ser. No. 60/888,151, filed Feb. 5, 2007, entitled "Automated FRET Imaging of LDL Intracellular Trafficking". This provisional application is incorporated herein by reference in its entirety.

TECHNICAL FIELD

This invention relates generally to the field of digital image processing, and more particularly, to methods, apparatuses and computer program products for analyzing one or more digital images to automatically select regions of interest thereof.

BACKGROUND OF THE INVENTION

Fluorescence (or Forster) resonance energy transfer (FRET), and in particular, energy transfer efficiency (E %), represents a powerful tool to investigate and quantitate biological processes, including protein-protein interactions and co-localization. For energy transfer to take place, four conditions have to be met. First, there has to be significant overlap between the donor fluorophore emission spectra and the acceptor fluorophore excitation spectra. Second, the average distance between donor and acceptor fluorophore molecules should be around 10 to 100 Å. Third, there has to be optical dipole-dipole orientation of donor and acceptor molecules. Fourth, the donor has to exhibit sufficient quantum yield. Since energy transfer itself is a dipole-dipole interaction, no photons are transferred.

There are certain shortcomings of FRET microscopy, which need to be addressed when attempting quantitative approaches. Because of the spectral overlap, necessary for FRET to occur in the first place, the signal is contaminated with donor and acceptor spectral bleed-through (SBT). The overlap between the donor and acceptor emission spectra results in the donor SBT. Acceptor SBT occurs when the donor excitation wavelength excites part of the absorption spectrum of the acceptor. Emission filters with different bandwidths have been used to remove donor crosstalk and acceptor bleed-through contamination, and are useful provided they do not cause a major reduction in the FRET signal.

Numerous algorithm-based FRET correction methodologies exist to remove donor and acceptor SBT, including, for example, those described in the following articles: G. W. Gordon et al., "Quantitative Fluorescence Resonance Energy Transfer Measurements Using Fluorescence Microscopy", Biophs. J., Vol. 74, pages 2702-2713 (1998); P. S. Bastiaens et al., "Microspectroscopic Imaging Tracks the Intracellular Processing of a Signal Transduction Protein: Fluorescent-Labeled Protein Kinase C Beta I", Proc. Natl. Acad. Sci., U.S.A., Vol. 93, pages 8407-8412 (1996); F. S. Wouters et al, "FRET Microscopy Demonstrates Molecular Association of Non-Specific Lipid Transfer Protein (nsL-TP) with Fatty Acid Oxidation Enzymes in Peroxisomes", EMBO J., Vol. 17, pages 71797189 (1998); C. E. Chamberlain, et al., "Imaging Spatiotemporal Dynamics of Rac Activation in vivo with FLAIR", Methods Enzymol., Vol. 325, pages 389-400 (2000); Z. Xia et al., "Reliable and Global Measurement of Fluorescence Resonance Energy Transfer Using Fluorescence Microscope" Biophys. J., Vol. 81, pages 2395-2402 (2001); and M. Elangovan et al., "Characterization of One- and Two-Photon Fluorescence Resonance Energy Transfer Microscopy", Methods, Vol. 29, pages 58-73 (2003), all of which are hereby incorporated herein by reference in their entirety.

One advantage of FRET is the ability to employ a variety of imaging systems, making it accessible to many researchers. Depending on imaging needs, one or more different systems may be suitable. Wide-field FRET microscopy might be ideal to investigate the cell nucleus or non-polarized cells; two-photon/multi-photon is best suited for thicker specimens (for example, greater than 100 μm) or donor and acceptor fluorophores with large spectral overlaps, e.g., CFP-YFP; one-photon laser-based scanning or arc lamp-based spinning-disk confocal microscopy systems can be employed for research of polarized cell monolayers that require the acquisition of discrete cellular focal planes at different heights; and investigation at the cell surface might best be done by total internal reflection fluorescence (TIRF).

As noted, one instrument- and biology-related issue in intensity-based FRET quantitative microscopy is spectral bleed-through (SBT) and background correction. Two main components are included in SBT; that is, the donor emission that crosses over into the acceptor emission spectrum (donor SBT) and the acceptor absorption that is excited by the donor excitation wavelength (acceptor SBT). In certain cases, the FRET signal is also contaminated by the acceptor absorption wavelength exciting the donor; however, this "back-bleed-through" is usually extremely low and within the background noise level.

There are a number of methods to address SBT contamination in intensity-based FRET. Each method has its own specific limitations, and the choice depends upon the level of sensitivity desired. For example, the degree of SBT can be established to determine whether SBT is linear, proportional or range dependent. Then, the most appropriate method for SBT correction can be selected, depending on the sensitivity required, the level of the FRET signal, and whether distance estimates are desired. One available approach is entitled "Precision FRET" (PFRET) available through CircuSoft Instrumentation, of Hockessin, Del. PFRET correction is an algorithm-based SBT correction method developed to generate corrected images that represent actual energy-transfer levels (PFRET images). The PFRET algorithm has two components, namely, one component which employs a specific algorithm for pixel-by-pixel SBT correction, which removes donor and acceptor SBT on the basis of matched fluorescence levels between the double-labeled specimen and single-labeled reference specimens, and the other which deals with the quantitative analysis of FRET images. The PFRET SBT correction method used to generate the PFRET images, i.e., PFRET=(uFRET)−(SBT) is actually based on the average value of narrow fluorescence ranges, for more efficient running of the correction algorithm (wherein uFRET is the uncorrected FRET).

The energy transfer efficiency (E %) can be calculated as a percentage of energy transfer in relation to the unquenched donor, as described in an article by H. Wallrabe et al., entitled "Issues in Confocal Microscopy for Quantitative FRET Analysis", Microscopy Research and Technique, Vol. 60, pages 196-206 (2006).

To analyze FRET data, visual inspection is conventionally employed to select appropriate regions of interest (ROIs) from the corrected FRET image (PFRET), and identify their pixel coordinates. These pixel locations are applied to the other images, and the fluorescence values are extracted (e.g., the acceptor fluorescence intensity image and the donor fluorescence intensity image and uFRET). Acceptor, quenched donor, and PFRET values are averaged over each ROI based on the original pixel-by-pixel analysis and transferred to a spreadsheet for calculation of additional parameters, such as energy transfer efficiency, unquenched donor and acceptor levels, and actual unquenched donor to acceptor ratios.

One drawback to the above approach is that a technician is required to visually inspect the images and manually select appropriate regions of interest. This selection of regions of interest is necessarily subjective, time consuming and expensive. Thus, there is a need in the art for an automated, computer-implemented image processing method and apparatus for selecting regions of interest within an image, such as a corrected FRET image (PFRET), to allow for implementation of an integrated quantitative FRET analysis for, for example, assaying the organization and distribution of receptors such as polymeric IgA receptors and transferrin receptors, as well as other biological applications of FRET.

SUMMARY OF THE INVENTION

Briefly summarized, presented herein, in one aspect, is a computer-implemented image processing method which includes: obtaining an image represented by an array of pixel intensity values; employing a first pixel box in progressively scanning and evaluating the image for areas of interest, wherein the first pixel box is sized as a first two-dimensional coordinate sub-array of pixels; selecting one or more areas of interest of the image employing the first pixel box, the selecting comprising identifying an area of interest within the image if at least one pixel-intensity-related characteristic of pixels within the first pixel box at a particular location of the image exceeds a first defined threshold; employing a second pixel box in progressively scanning and evaluating selected areas of interest of the image for one or more regions of interest, wherein each area of interest is larger than a region of interest, the second pixel box is sized as a second two-dimensional coordinate sub-array of pixels, and the second pixel box is smaller than the first pixel box; selecting one or more regions of interest of the image employing the second pixel box, the selecting including identifying a region of interest within the image if the at least one pixel-intensity-related characteristic of pixels within the second pixel box at a particular location of an area of interest exceeds a second defined threshold, wherein the second defined threshold is greater than the first defined threshold; and performing at least one of storing or outputting location identifying information for selected regions of interest of the image.

In an additional aspect, a computer-implemented image processing method is provided which includes: obtaining an image represented by an array of pixel intensity values; evaluating the image for regions of interest, wherein the evaluating includes: (i) employing a first pixel box in evaluating the image, the employing including determining for pixels within the first pixel box a pixel-intensity-related characteristic, wherein the first pixel box is sized as a first two-dimensional coordinate sub-array of pixels; (ii) determining for pixels within a second pixel box the pixel-intensity-related characteristic, wherein the second pixel box is sized as a second two-dimensional coordinate sub-array of pixels, and wherein the second pixel box is smaller than the first pixel box and shares a common center with the first pixel box; (iii) selecting pixels within the first pixel box as a region of interest of the image if a difference between the pixel-intensity-related characteristic of the first pixel box and the pixel-intensity-related characteristic of the second pixel box exceeds a defined threshold; and performing at least one of saving or outputting location identifying information for the selected regions of interest of the image.

In a further aspect, a computer-implemented image processing method is provided which includes: obtaining an image represented by an array of pixel intensity values and comprising multiple identified regions of interest within the image, wherein at least two regions of interest of the multiple identified regions of interest within the image overlap; and selecting one region of interest of the at least two regions of interest overlapping within the image, the selecting including: selecting the region of interest of the at least two regions of interest having a highest multiple of at least two pixel-intensity-related characteristics of pixels within respective regions of interest of the at least two overlapping regions of interest of the image; and performing at least one of saving or outputting location identifying information for the selected region of interest having the highest multiple of the at least two pixel-intensity-related characteristics.

Apparatuses and articles of manufacture corresponding to the above-summarized methods are also presented herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

As briefly noted, presented herein are automated computer-implemented methods, apparatuses and articles of manufacture for identifying or selecting regions of interest in a digital image, such as a punctate image. By setting one or more defined thresholds, a user of the computer-implemented processing may control or direct selection of the regions of interest within the image. More particularly, by setting a defined threshold for one or more pixel-intensity-related characteristics of pixels within a region of the image under evaluation, a user may control the automated region of interest selection processing presented herein.

As one example, an intensity-based fluorescence resonance energy transfer (FRET) image is obtained to study the organization of proteins in membranes, and regions of interest thereof are automatically selected, as described herein. Those skilled in the art will note, however, that the concepts presented are applicable to various digital images represented as pixel intensity values. Further, the concepts presented herein may be implemented in any one of various programming languages as a stand-alone image processing program or as a plug-in to an existing image processing program, for example, as an enhancement to the capabilities of an existing program such as MetaMorph software available from Molecular Devices Corporation of Sunnyvale, Calif.

Figure 1:
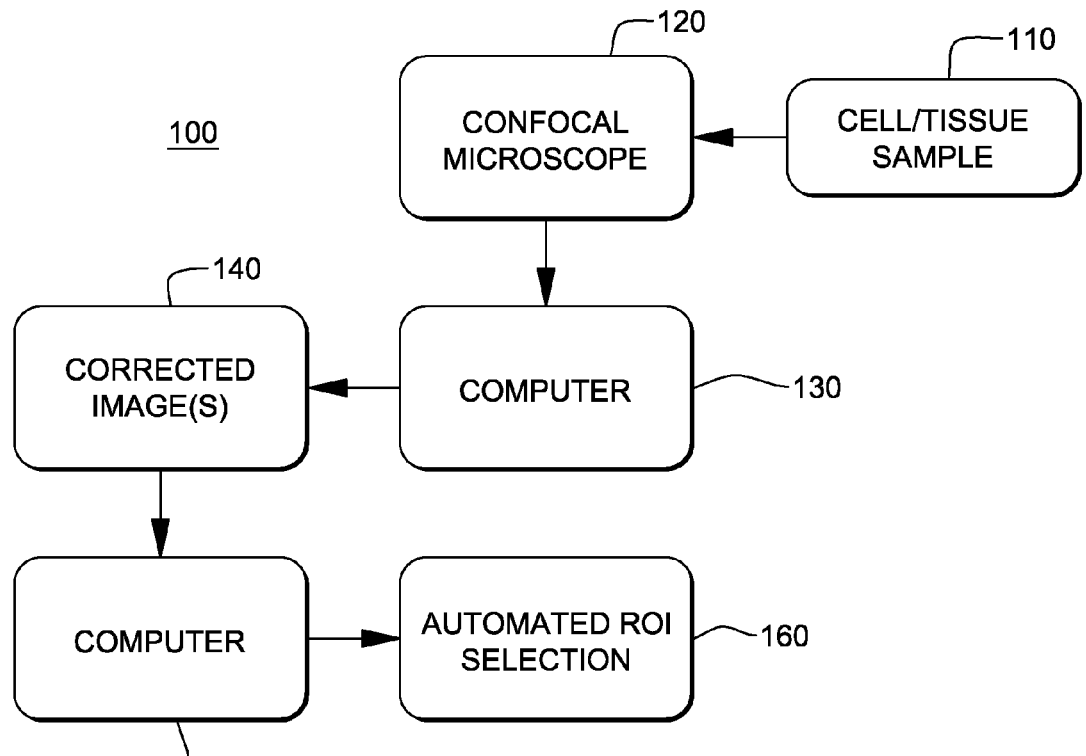
FIG. 1 depicts one embodiment of a computer-implemented image processing apparatus employing automated region of interest (ROI) selection, in accordance with one or more aspects of the present invention.

Referring to FIG. 1, one embodiment of an integrated image processing apparatus, generally denoted 100, pursuant to one or more aspects of the present invention, is illustrated. Apparatus 100 receives (in one embodiment) a cell/tissue sample 110, which is assumed to have donor and acceptor fluorphores within 1-10 nm of each other, donor emission and acceptor excitation which show significant spectral overlap, donors with a high-emission quantum yield and a favorable dipole-dipole orientation such that one or more FRET images can be employed to visualize quantitative protein-protein interactions. A confocal microscope 120 is employed to visualize the cell/tissue sample and obtain one or more intensity-based FRETs wherein donor fluorescence intensity is reduced (quenched), and acceptor fluorescence is increased (sensitized). The intensity-based FRET(s) is input to a first computer 130 for processing, including, spectral bleed-through (SBT) correction using, for example, the above-referenced precision FRET available through CircuSoft Instrumentation of Hockessin, Del. For example, an uncorrected fluorescence resonance energy transfer (uFRET) image is processed pixel-by-pixel by the above-noted PFRET correction algorithm to remove SBT and generate PFRET images using single-labeled donor and acceptor images as reference. The resultant PFRET image represents the total corrected energy transfer after processing with the SBT correction PFRET algorithm.

First computer 130 outputs corrected image(s) 140 (e.g., a PFRET image) to a second computer 150 for automated region of interest (ROI) selection 160, in accordance with one or more aspects of the present invention. First computer 130 and second computer 150 may be the same or different computers. As used herein, "computer" includes any real or virtual computing or processing unit. As specific examples, the one or more computers 130, 150 may be one or more personal computers, laptop computers, embedded computers, mainframe computers, etc. (employing, for example, one or more central processing units, memory and input/output devices), which are well known in the art. For example, the computers illustrated in FIG. 1 may comprise one or more notebook computers, desktop computers, workstations or servers offered by Dell, Inc. or Hewlett-Packard, Inc.

Next, the corrected (e.g., PFRET) image(s) is scanned for regions of interest (ROIs) having high intensity employing the automated computer-implemented image processing described below with reference to FIGS. 2-14. In one implementation, regions of interest are selected based on multiple criteria, including: non-overlapping; central distribution; and PFRET intensity threshold, with a decreasing threshold increasing the number of ROIs. The multiple criteria may be preset or user-defined for a particular application.

After identifying ROIs, energy transfer efficiency (E %), acceptor (A) and donor (D) levels are extracted for selected ROIs. Energy transfer efficiency (E %) can be calculated as a percentage of the unquenched donor (uD), which represents the total potential for energy transfer, and PFRET is the total corrected energy transfer (after processing with the SBT correction algorithm). Specifically:

$$uD = \text{Quenched donor} + (PFRET * \gamma)$$

$$E\ \% = 100 \times \frac{PFRET * \gamma}{uD}$$

Wherein γ factor is a function of the quantum yield of the fluorophores and the detection set-up, and plays a role in recording precise E % and distances between fluorophores. However, since the excitation and detection efficiencies, as well as quantum yields, remain constant throughout, the γ does not effect relative FRET results. Therefore, for simplicity, γ=1 can be employed in the automated FRET analysis.

Referring now to FIGS. 2-14, one or more aspects of automated region of interest selection processing in accordance with the present invention are next described.

Figure 2:
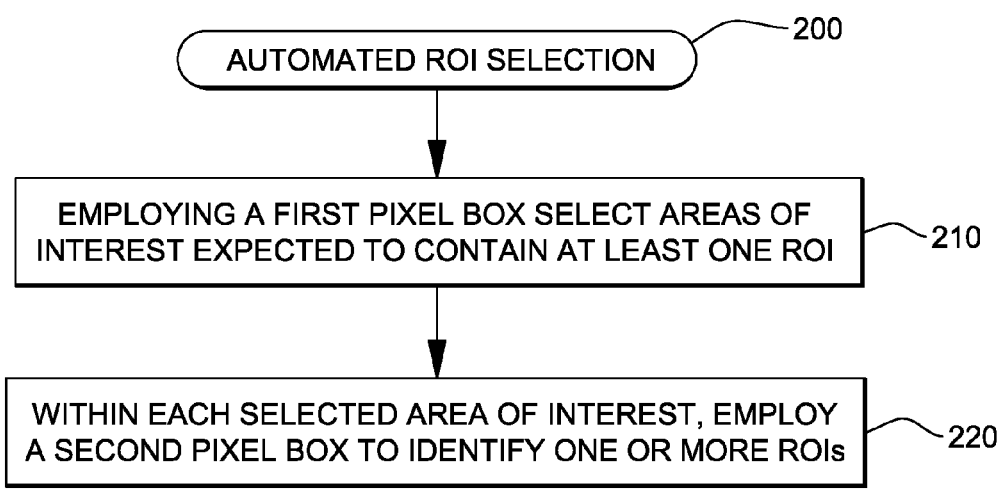
FIG. 2 is a high level flowchart of one embodiment of an automated process for selecting regions of interest within an image, in accordance with one or more aspects of the present invention.

FIG. 2 is a high level flowchart of one embodiment of an automated process for selecting regions of interest within an image. This ROI selection process 200 begins with selection of one or more areas of interest expected to contain one or more regions of interest 210. As explained in detail below, a first pixel box, such as a 32×32 pixel box, is selected and superimposed on pixels of an image to be evaluated (e.g., a 512×512 pixel image). If pixels within the first pixel box have one or more pixel-intensity-related characteristics exceeding a respective defined threshold(s), then the pixels within the first pixel box are identified as an area of interest. In one implementation, the respective defined thresholds for identifying areas of interest are inclusive thresholds to ensure that any potential region of interest falling within the first pixel box is retained. Within each area of interest, a second pixel box is employed to evaluate pixels within the area of interest and identify one or more regions of interest 220. Again, and by way of specific example, the image might comprise a 512×512 array of pixels, or more particularly, of pixel intensity values. The first pixel box might be a 32×32 pixel box, and the second pixel box an 8×8 pixel box, with regions of interest being identified as 10×10 pixel regions using the processing described herein.

Figure 3:
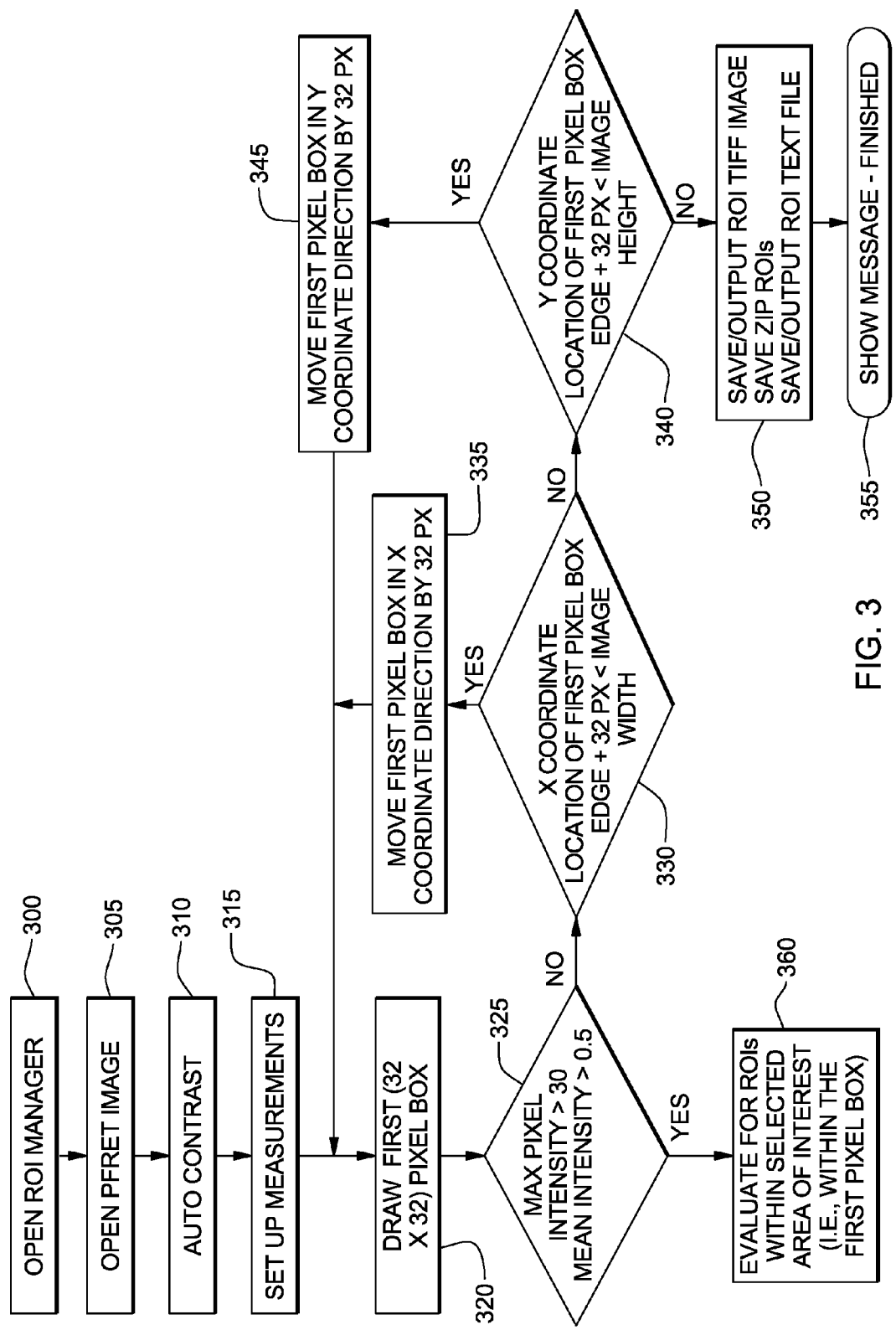
FIG. 3 is a flowchart of one embodiment for selecting areas of interest using a first pixel box (e.g., a 32×32 pixel box), in accordance with one or more aspects of the present invention.
Figure 4:
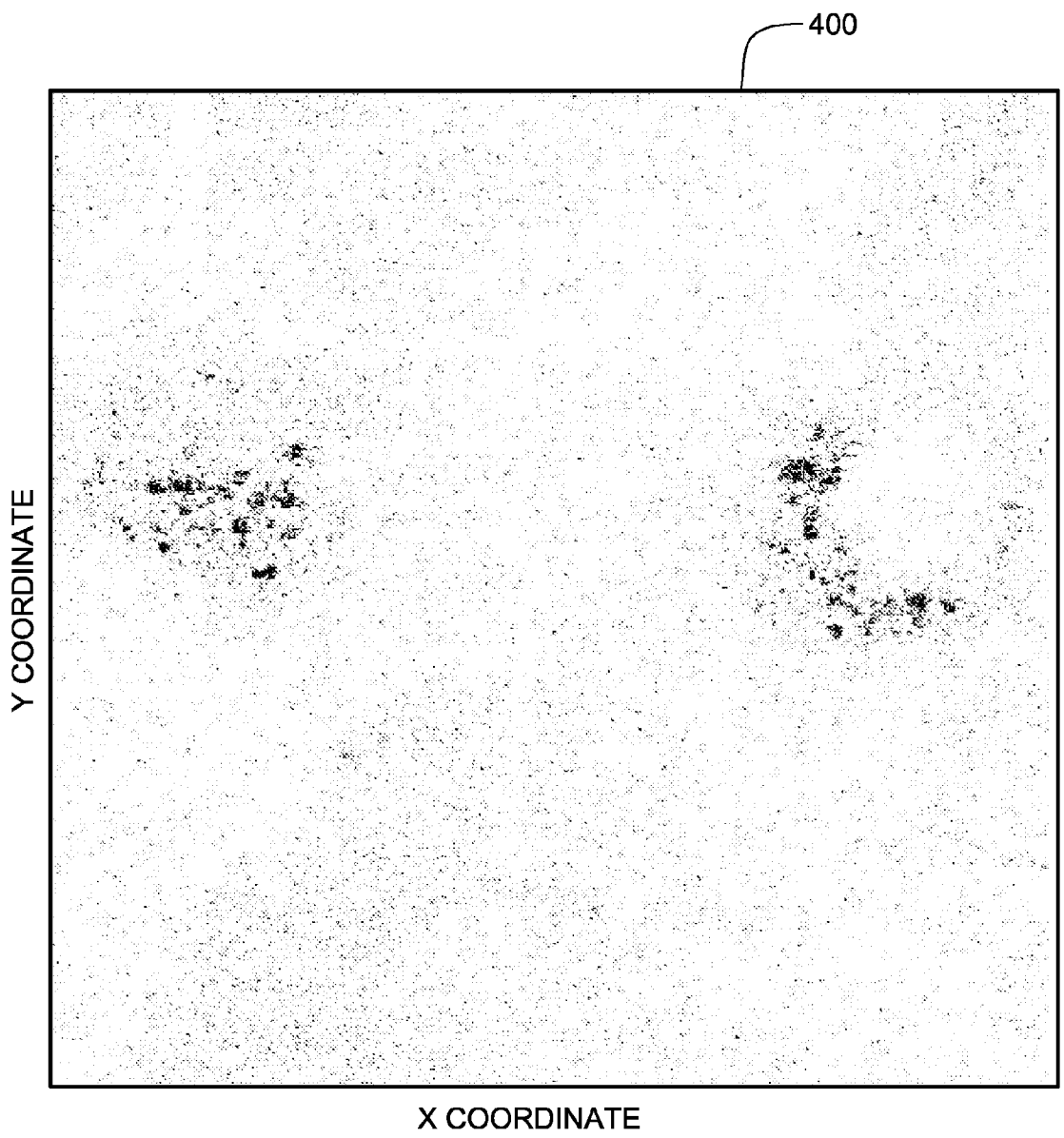
FIG. 4 is a negative representation of one embodiment of a punctate image represented by an array of pixel intensity values, and which is to undergo automated region of interest processing, in accordance with one or more aspects of the present invention.

FIG. 3 depicts one embodiment for processing selecting areas of interest using, for example, a first pixel box which is 32×32 pixels in x, y coordinates. The flowchart begins with opening of the ROI process or manager 300, as well as obtaining of a PFRET image 305. As used herein, the term "obtaining" as in, for instance, "obtaining an image", includes, but is not limited to, fetching, receiving, having, providing, being provided, creating, developing, etc. One negative representation of such a PFRET image 400 is illustrated in FIG. 4. In this negative representation, dark regions represent pixels of greater intensity, and thus, regions of interest.

Figure 5:
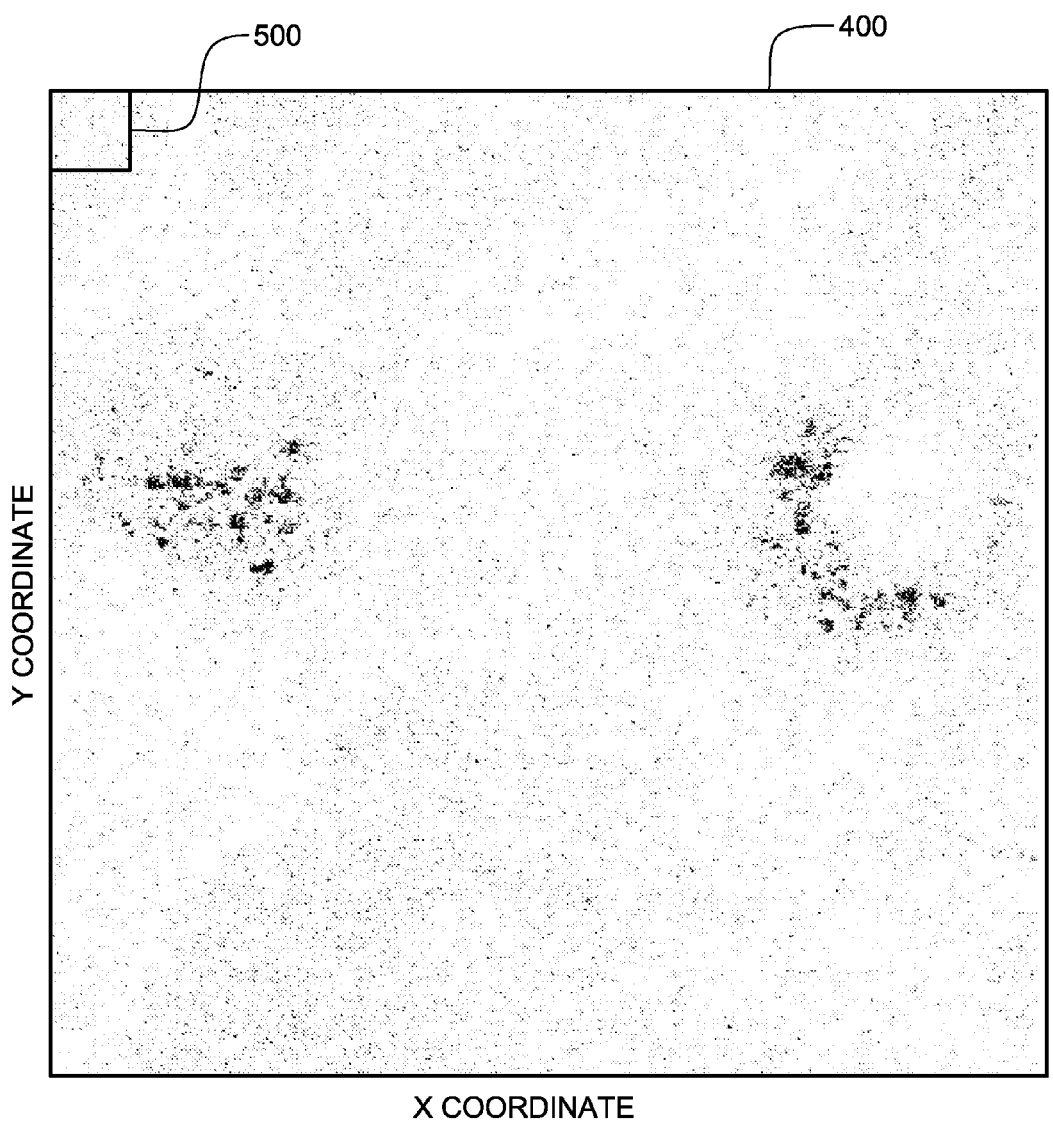
FIG. 5 depicts the image of FIG. 4 with a first pixel box superimposed thereon for evaluation of pixels within the first pixel box at a particular location of the image, in accordance with one or more aspects of the present invention.

Next, measurements are set up 315. This step allows a user to designate one or more parameters to be employed in selecting areas of interest, and/or regions of interest from the areas of interest. By way of example, one or more of the defined thresholds discussed below may be initially set up or chosen by a user. A first (32×32) pixel box is then drawn (e.g., actually or virtually) 320. One example of this first pixel box 500 is illustrated in FIG. 5 for image 400. In FIG. 5, first pixel box 500 is shown in the upper left corner of the image. First pixel box 500 may be drawn "actually" by displaying the box superimposed on an image, which allows a user to follow the ROI selection procedure dynamically. Alternatively, the pixel box can be drawn "virtually" by identifying a two-dimensional subarray of coordinates to be evaluated. In this case, the two-dimensional subarray of coordinates need not be displayed to a user.

Next, processing determines whether one or more pixels-intensity-related characteristics of pixels within the first pixel box are above respective defined threshold(s). In the example of FIG. 3, two pixel-intensity-related characteristics are employed, namely maximum pixel intensity of pixels within the first pixel box and mean intensity of pixels within the first pixel box. Thus, processing determines whether the maximum pixel intensity for the 32×32 pixels within the first pixel box is greater than a defined threshold, for example, 30 on a scale of 0 to 255, and whether the mean pixel intensity of the pixels within the box is greater than a respective defined threshold (for example, 0.5) 325. The defined thresholds for maximum pixel intensity and mean pixel intensity are chosen to be inclusive of any area having a potential region of interest. Depending upon the implementation, these defined thresholds could be user-set or empirically predetermined.

Assuming that the first pixel box does not contain any pixel with a maximum pixel intensity greater than 30 or pixels with a mean intensity greater than 0.5, then processing determines whether the x-coordinate location of an edge of the box plus 32 pixels is within the image width 330. If "yes", then the first pixel box is moved in the x-coordinate direction by 32 pixels 335 and processing returns to evaluate pixels of a new first pixel box 320. Once the first pixel box has progressed in the x-coordinate direction from one edge to another edge of the image, then from inquiry 330, processing determines whether the y-coordinate location of an edge of the first pixel box plus 32 pixels is within the image height 340. If so, then the first pixel box is moved in a y-coordinate direction by 32 pixels 345 and a new first pixel box is generated (again, actually or virtually) for evaluation of the pixels therein. Once an edge of the first pixel box is at or outside the image edge, then processing performs one or more of saving and/or outputting a region of interest as a TIFF image(s), saving a ZIP file with the ROIs, and/or saving/outputting a region of interest text file 350, after which a finished message 355 is presented to the user.

Figure 6:
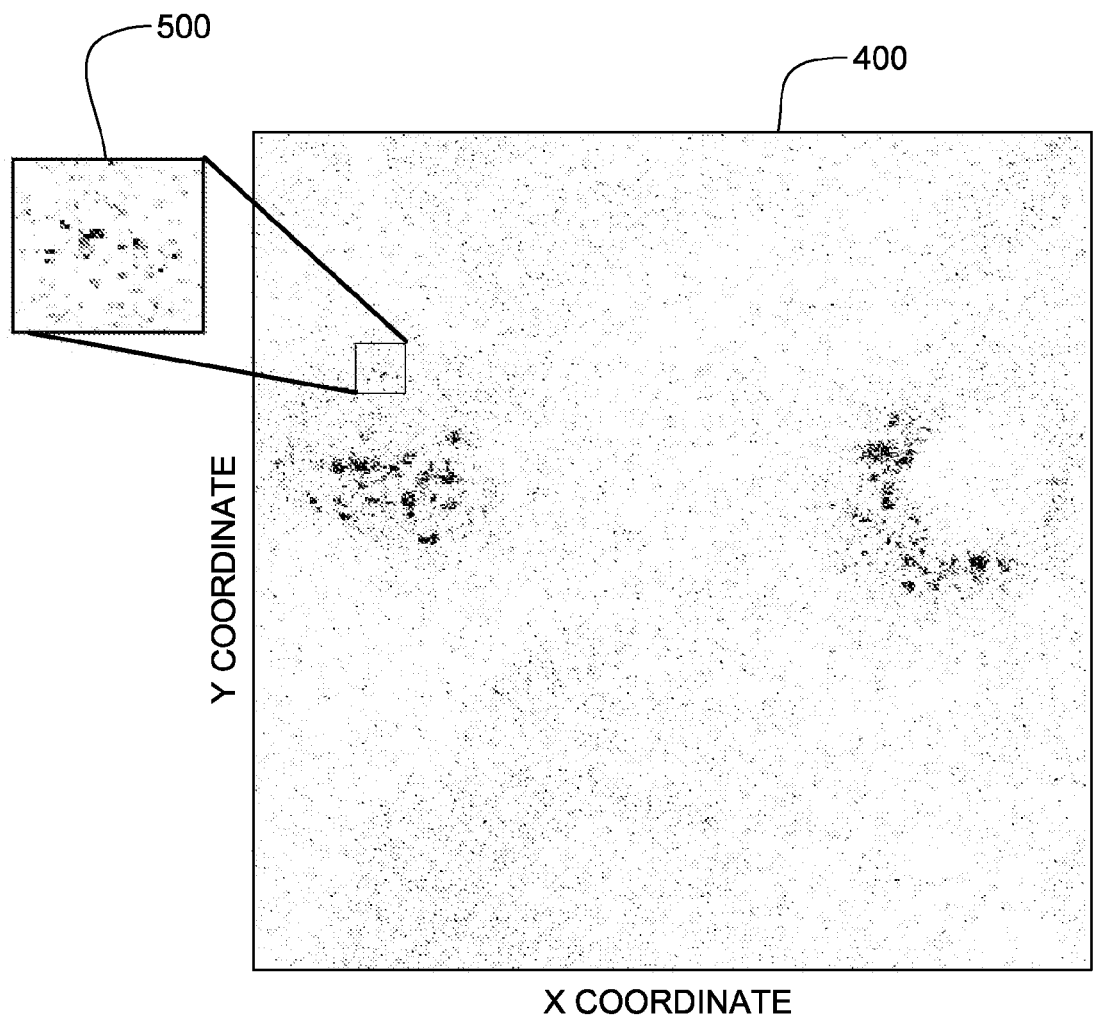
FIG. 6 depicts the image of FIGS. 4 & 5 with the first pixel box shown moved in the x-coordinate direction and y-coordinate direction, and illustrating in the enlarged view pixels within the negative representation of the image, wherein the pixels within the first pixel box are assumed to have pixel-intensity-related characteristics greater than respective defined thresholds and thus to represent an area of interest, in accordance with one or more aspects of the present invention.

FIG. 6 illustrates image 400 of FIGS. 4 & 5, with the first pixel box having progressed from the upper left corner horizontally and vertically to a location as illustrated. Within this first pixel box 500, the dark pixels again represent pixels of highest intensity.

Figure 7A:
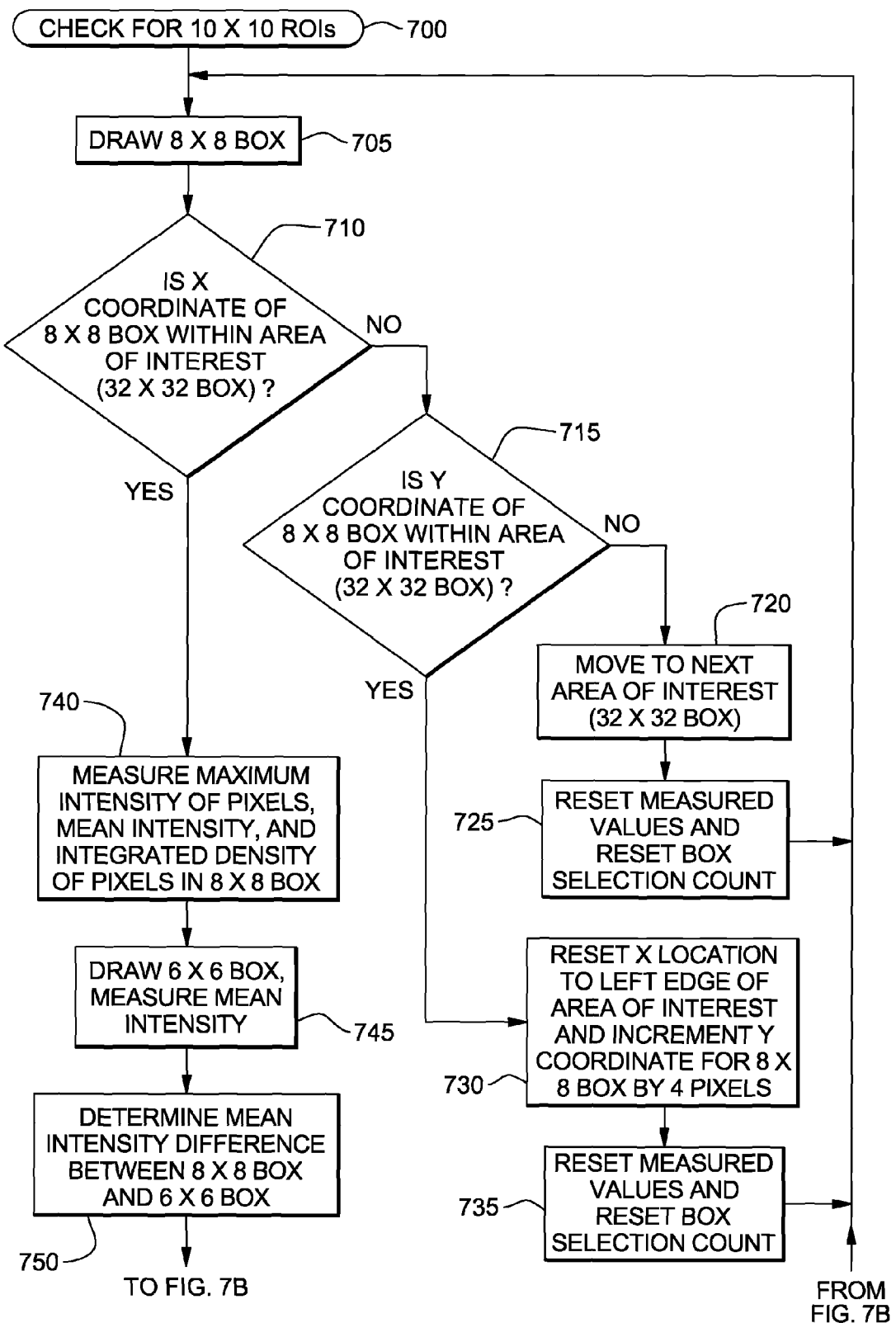
FIGS. 7A & 7B are a flowchart of one embodiment of processing for evaluating selected areas of interest for regions of interest, in accordance with one or more aspects of the present invention.
Figure 7B:
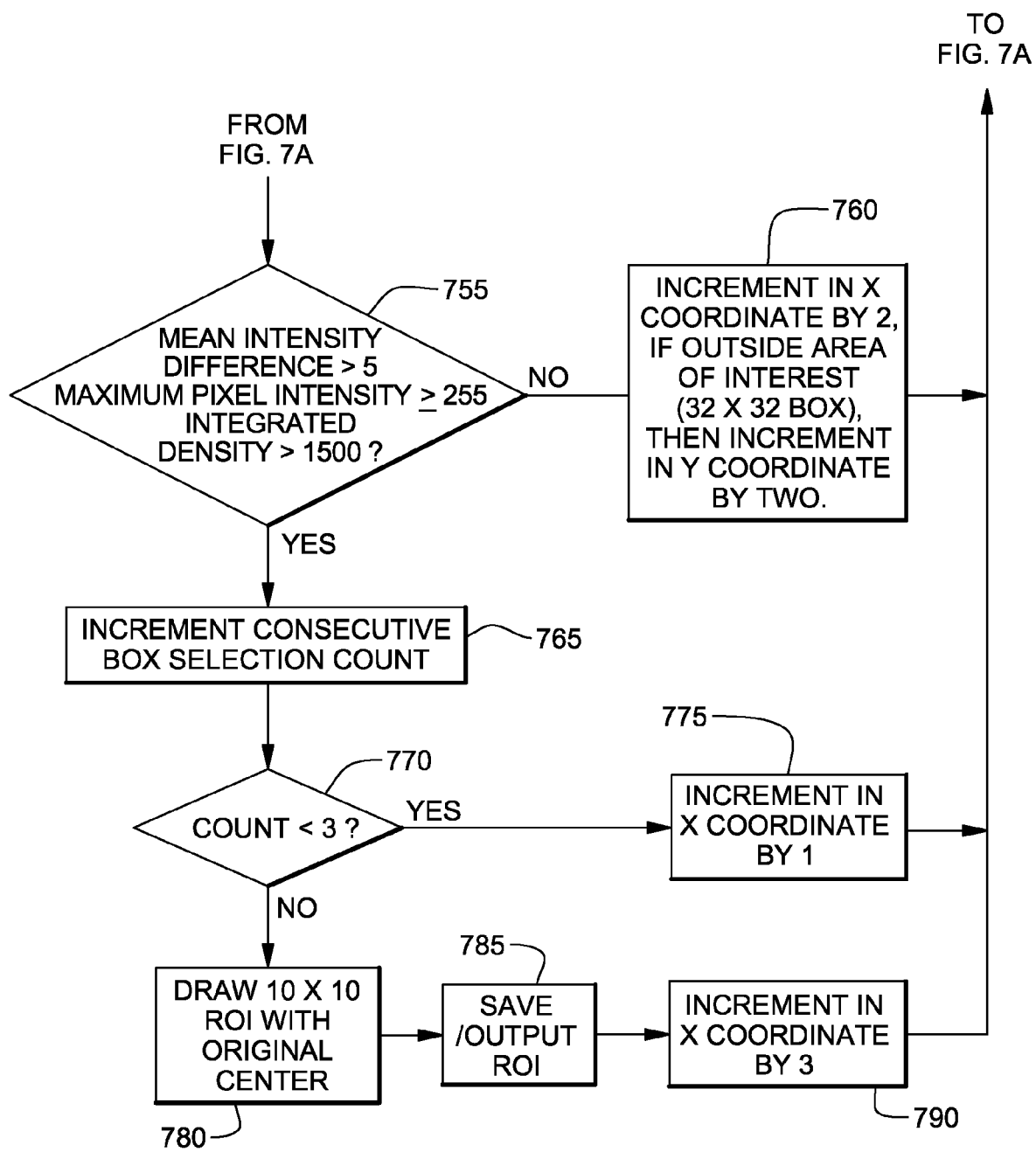

Commensurate with selection of pixels within a first pixel box as an area of interest, a selected area of interest from inquiry 325 is evaluated for regions of interest 360 employing, for example, the processing of FIGS. 7A & 7B.

Referring to FIGS. 7A & 7B, the ROI processing checks for a 10×10 region of interest 700 within the selected area of interest (e.g., the 32×32 pixels within an area of interest having a maximum pixel intensity greater than 30 and a mean pixel intensity greater than 0.5). This automated evaluation process of FIGS. 7A & 7B begins by drawing, generating or superimposing (either actually or conceptually) a second pixel box (e.g., an 8×8 pixel box) onto the image within the area of interest to be evaluated 705. The x coordinate of the 8×8 pixel box is then evaluated to determine whether the 8×8 pixel box is within the area of interest (i.e., the 32×32 pixels comprising the area of interest in this example) 710. Assuming that evaluation of the area of interest begins from the lower left corner of the 32×32 pixel box, processing is determining whether the right edge of the 8×8 pixel box is outside the 32×32 pixel box. If the x coordinate edge of the 8×8 box is not within the area of interest, then processing evaluates the y coordinate of the 8×8 pixel box to determine whether the y coordinate value of the 8×8 pixel box is within the area of interest 715. If "no", then both the x coordinate and the y coordinate of the 8×8 pixel box are outside the area of interest, and processing is instructed to move to a next area of interest (i.e., a next 32×32 pixel box) 720, after which, measured values and the box selection counter are reset 725 before a next 8×8 pixel box is drawn within the new area of interest. If the y coordinate of the 8×8 pixel box is within the current area of interest, then the x location of the 8×8 is set to, for example, the left edge of the area of interest and the y coordinate location for the 8×8 box is incremented by four pixels 730. If beginning at the upper left corner of the 32×32 box, then the y coordinate for the 8×8 box may be decremented four pixels. Next, any measured values are reset, along with the box selection counter described below 735. Processing thereafter returns to draw a new 8×8 box 705.

Assuming that the x coordinate of the 8×8 pixel box is within the area of interest (i.e., the 32×32 pixel box in this example), then the maximum intensity of pixels within the second pixel box is determined, as well as the mean intensity and the integrated density of the pixels 740. The integrated density is obtained by multiplying the area within the second pixel box by the intensity of pixels within that area. In one example, the maximum intensity of pixels refers to pixel intensity value on a scale of 0-255, and the mean intensity is the average intensity value of pixels within the pixel box.

Next, a third pixel box (e.g., a 6×6 pixel box) is drawn, generated or superimposed (either actually or conceptually) within the second pixel box and sharing a same center point as the second pixel box 745. The mean intensity of pixels within this third pixel box is determined, and the mean intensity difference between pixels of the second pixel box and the third pixel box is then ascertained 750.

As noted in FIG. 7B, pixels within the second pixel box (i.e., the current 8×8 box) are flagged for possible region of interest selection if the mean intensity difference between the second pixel box and third pixel box is greater than a defined threshold (for example, 5), the maximum pixel intensity of pixels within the second pixel box is greater than or equal to a respective defined threshold (for example, 255), and the integrated density is greater than another respective defined threshold (for example, 1500) 755. If all conditions are not met, then the 8×8 pixel box is incremented in the x-coordinate by 2 pixels 760, and a new 8×8 box is drawn 705.

Assuming that the three pixel-intensity-related characteristics noted in inquiry 755 are above their respective defined thresholds, then the pixels within the second pixel box may be of interest and a counter, referred to herein as the consecutive box selection count 765, is incremented. In this embodiment, processing next determines whether the count is less than three 770, and if so, increments the box location in the x-coordinate direction by one pixel 775 before returning to draw the next 8×8 box 705. Thus, in accordance with the processing presented, three consecutive 8×8 pixel boxes, each offset by one pixel in the x coordinate direction, need to be chosen before a region of interest is identified.

If the pixels within the current pixel box under evaluation are selected and the consecutive box count equals three, then a 10×10 region of interest is identified with the original center 780, and saved/output 785. After identifying a 10×10 ROI, processing increments the pixel box in the x-coordinate by 3 pixels 790 and returns to draw a next 8×8 pixel box 705 (FIG. 7A).

Figure 8:
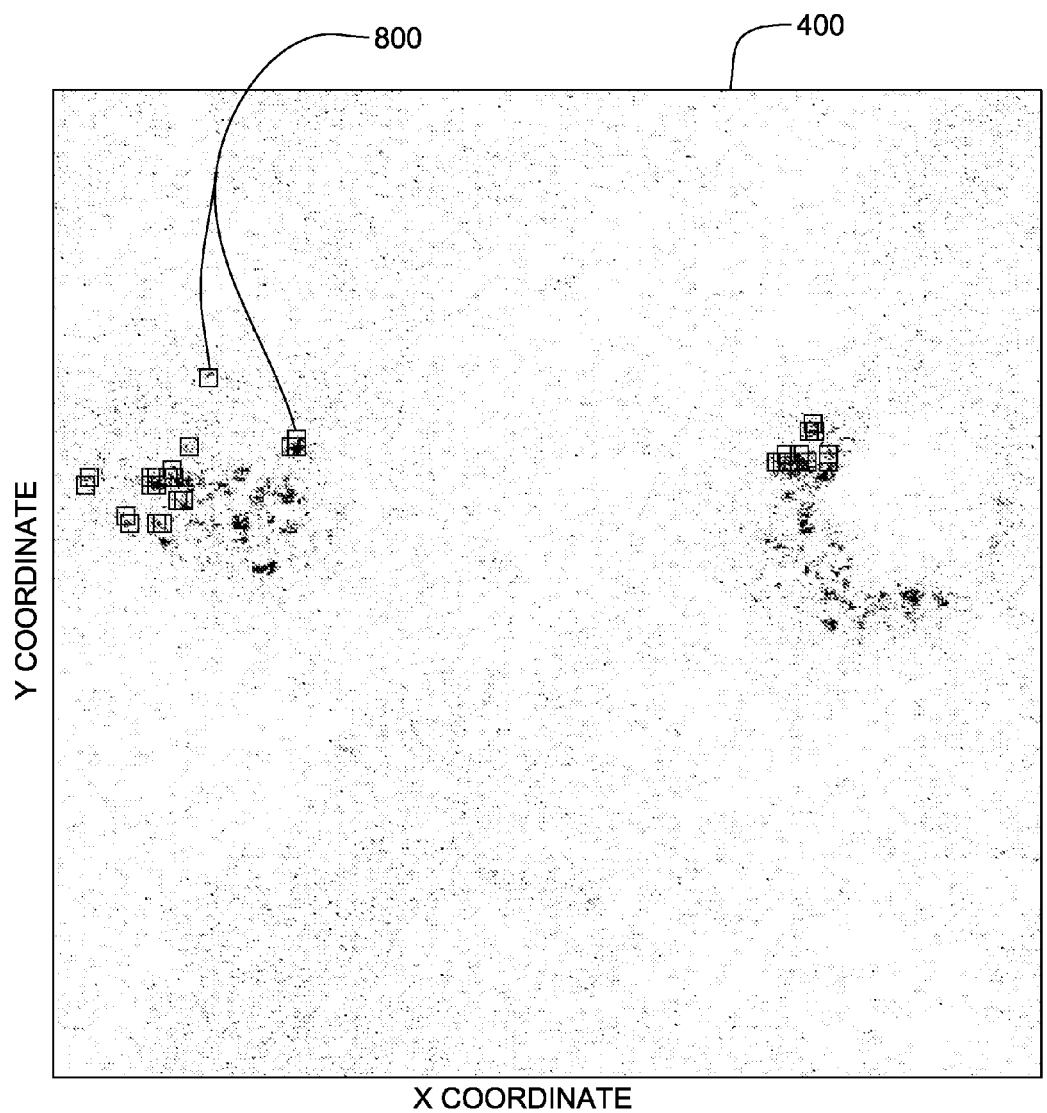
FIG. 8 depicts the image of FIGS. 4-6 with several identified regions of interest displayed on the image, in accordance with one or more aspects of the present invention.

FIG. 8 depicts image 400 with regions of interest 800 superimposed onto the image, as identified by the processing of FIGS. 3 & 7A, 7B.

Figure 9:
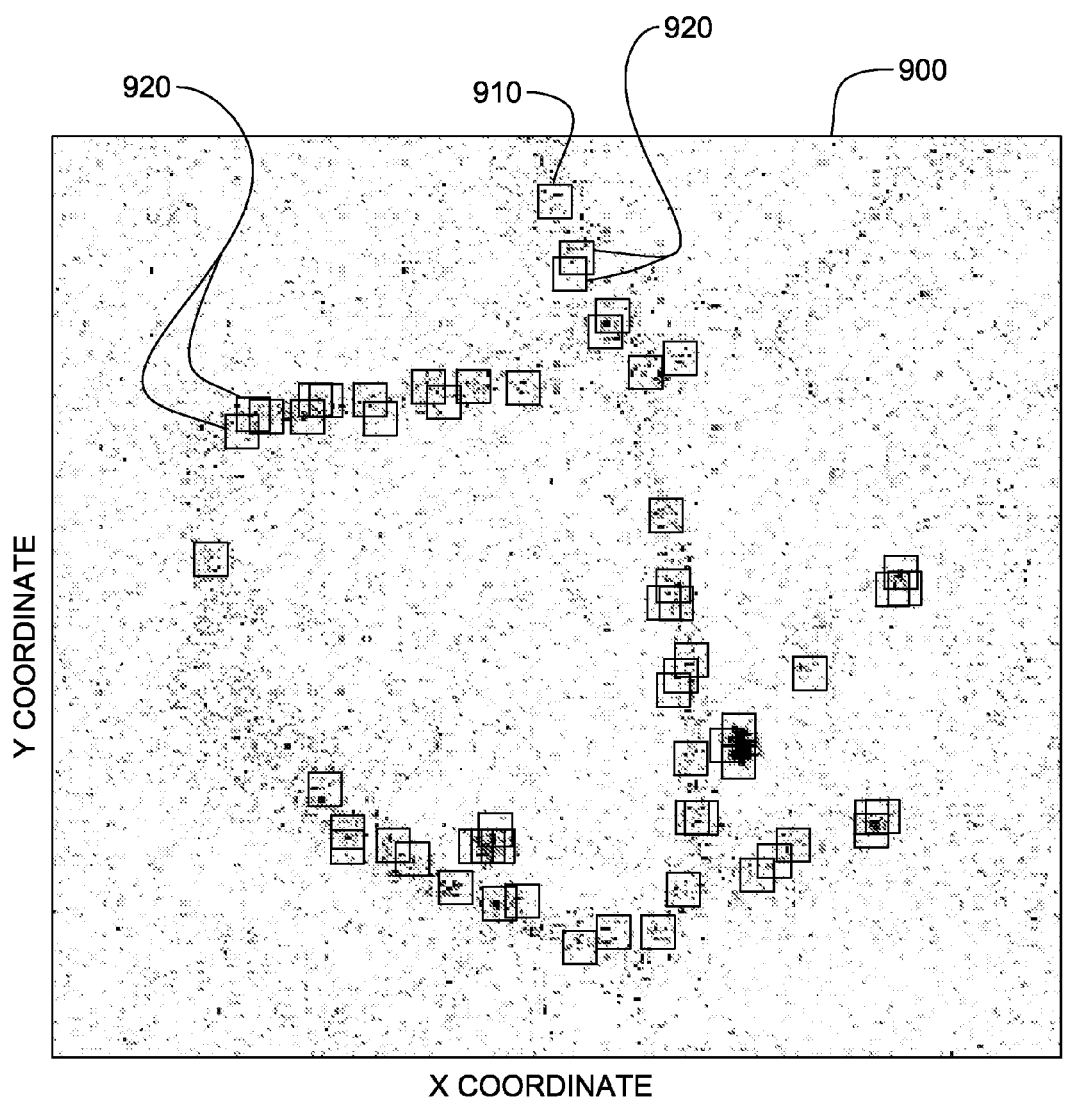
FIG. 9 is a negative representation of another punctate image represented as an array of pixel intensity values and having undergone region of interest processing, in accordance with one or more aspects of the present invention.

FIG. 9 is a negative representation of another punctate image 900 represented as an array of pixel intensity values. Image 900, which is illustrated with dark areas representing pixels of higher intensity, has undergone ROI selection with a plurality of regions of interest 910 having been identified and superimposed onto the image. Further, various ROIs are shown overlapping 920. Depending on the implementation, it may be desirable to remove these overlapping ROIs by selecting a best ROI for further processing.

Figure 10:
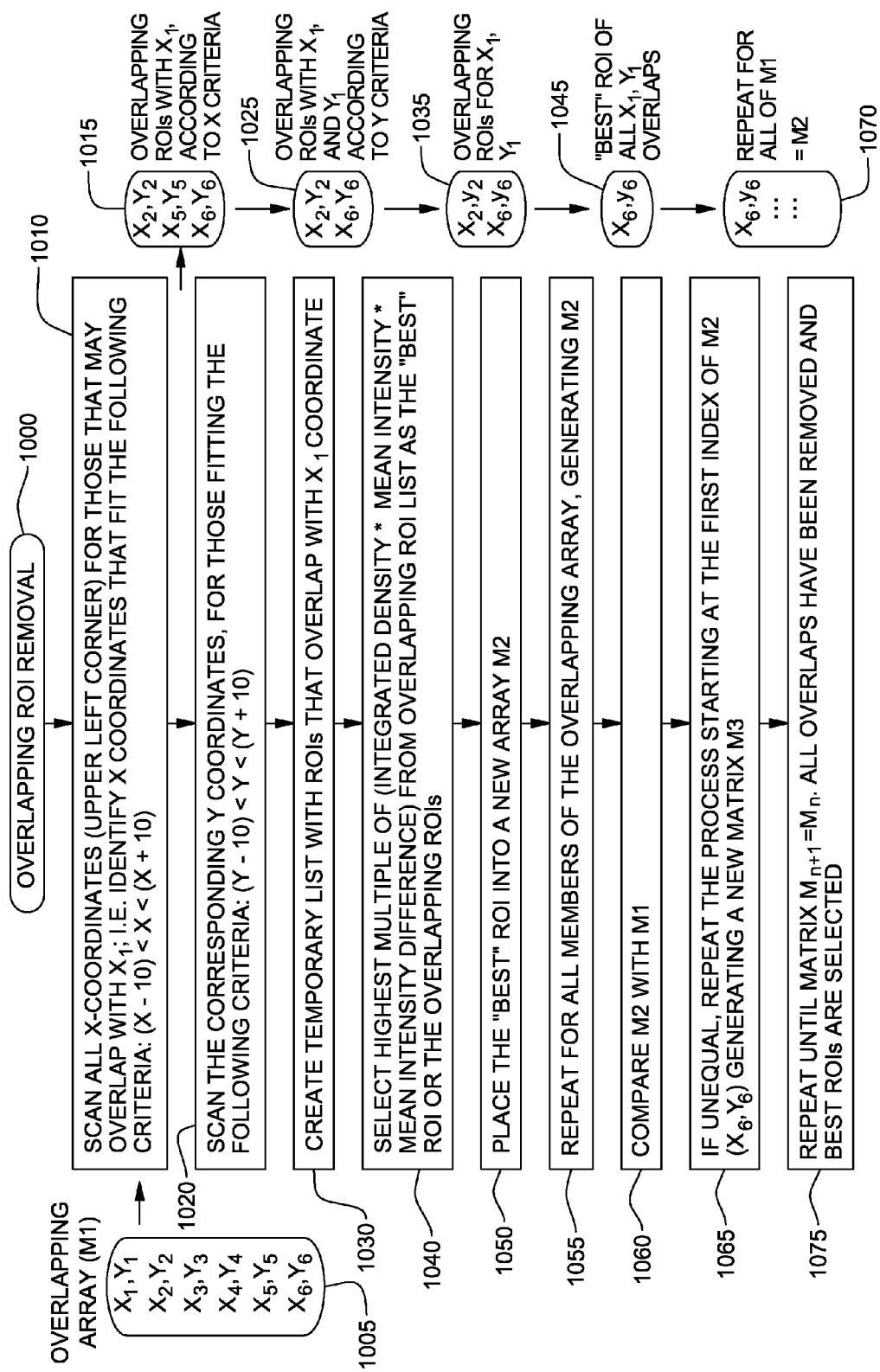
FIG. 10 is a flowchart of one embodiment of processing for selecting a particular region of interest from multiple overlapping regions of interest, in accordance with one or more aspects of the present invention.

FIG. 10 depicts one embodiment of processing for selecting a best ROI from two or more overlapping ROIs. Overlapping ROI removal proceeds on an overlapping array (M1) 1005, wherein a region of interest is represented by an x, y coordinate, such as the upper left x, y coordinate of the region of interest. Thus, $x_1$, $y_1$ in the M1 array identifies an x, y location of a first region of interest. The overlapping ROI removal process 1000 begins with scanning from the upper left corner of an ROI for overlapping ROI x-coordinates. That is, the ROI identifiers with x-coordinates that fit the following criteria are identified: $(x-10) \leq x \leq (x+10)$ This results in a matrix 1015 wherein overlapping ROIs in the x-coordinate dimension are identified. Processing then scans the corresponding y-coordinates in the overlapping ROIs for those ROI identifiers fitting in the following criteria 1020: $(y-10) \leq y \leq (y+10)$.

This results in an overlapping ROI list 1025 identifying all ROIs overlapping with the first ROI.

A temporary list of ROIs that overlap with the x-, y-coordinate is created 1030. This list 1035 identifies the overlapping ROIs for the initial ROI identified by $x_1$, $y_1$.

Next, processing selects the ROI with the highest multiple of a plurality of pixel-intensity-related characteristics for that ROI from the overlapping ROIs in list 1035. In one example, the ROI with the highest multiple of (integrated density)× (mean intensity)×(mean intensity difference) is employed from the overlapping ROI list 1035 as the "best" ROI for the overlapping ROIs. The best ROI 1045 of all ROIs overlapping $x_1$, $y_1$ is placed in a new array M2 1050 and the process is repeated for all members of the overlapping array M1 1055, generating array M2 1070. The new array M2 (i.e., $M_{n+1}$) is then compared with the original overlapping array $M_n$ 1060. If unequal, the process is repeated starting at the first index (i.e., $x_6$, $Y_6$) of $M_2$ as the new of array $M_n$, generating a new matrix M3 (i.e., a new $M_{n+1}$) 1065. The process is repeated until the final matrix $M_{n+1}=M_n$ is achieved, wherein all overlaps have been removed and the best ROIs selected 1075, and wherein n is equal to the number of iterations through the process.

Figure 11:
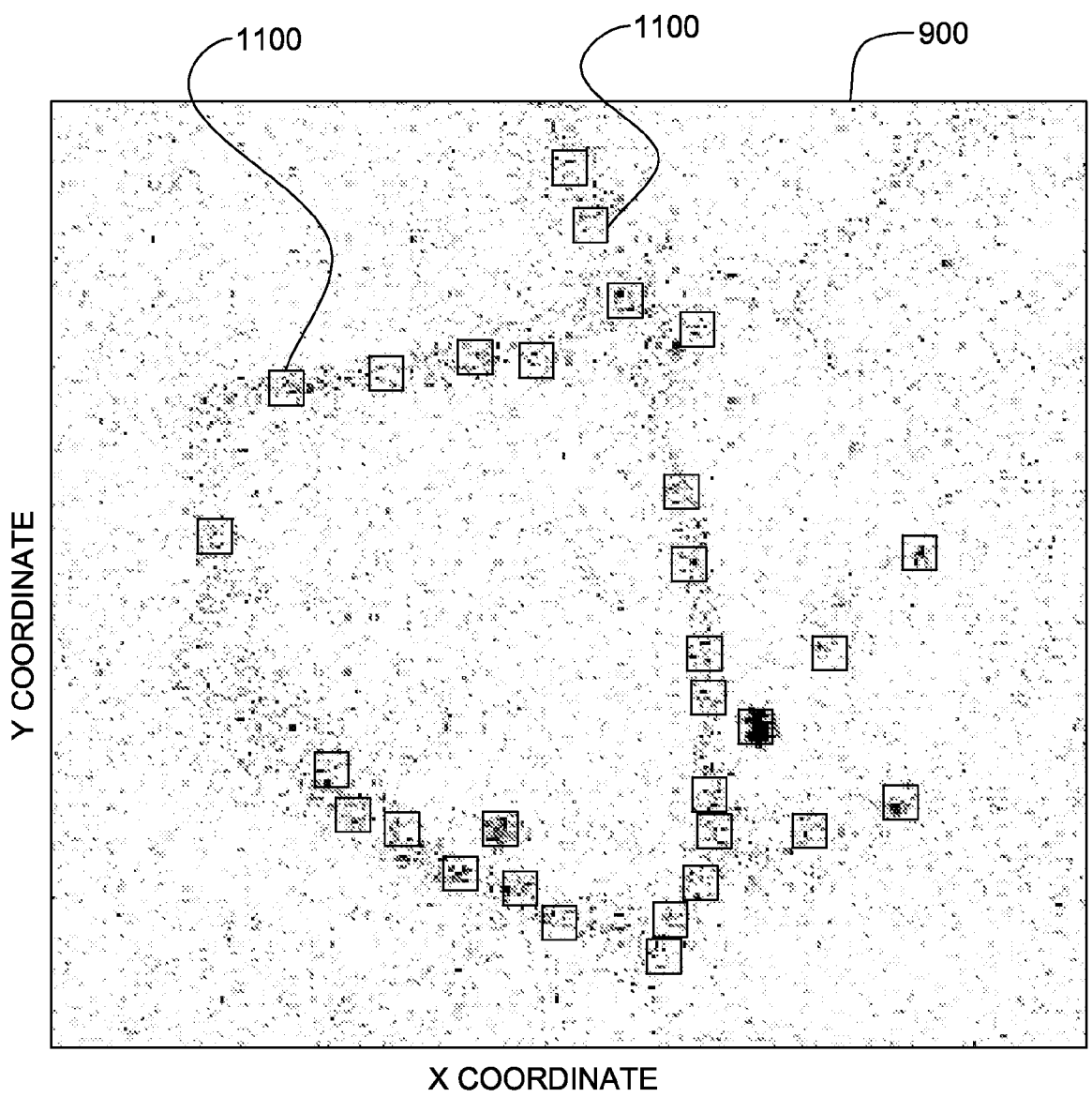
FIG. 11 depicts the punctate image of FIG. 9, with only non-overlapping regions of interest selected using the processing of FIG. 10, in accordance with one or more aspects of the present invention.

FIG. 11 depicts image 900 of FIG. 9 with the overlapping ROIs removed by selection of a best ROI 1100 wherever two or more original ROIs overlapped.

Figure 12:
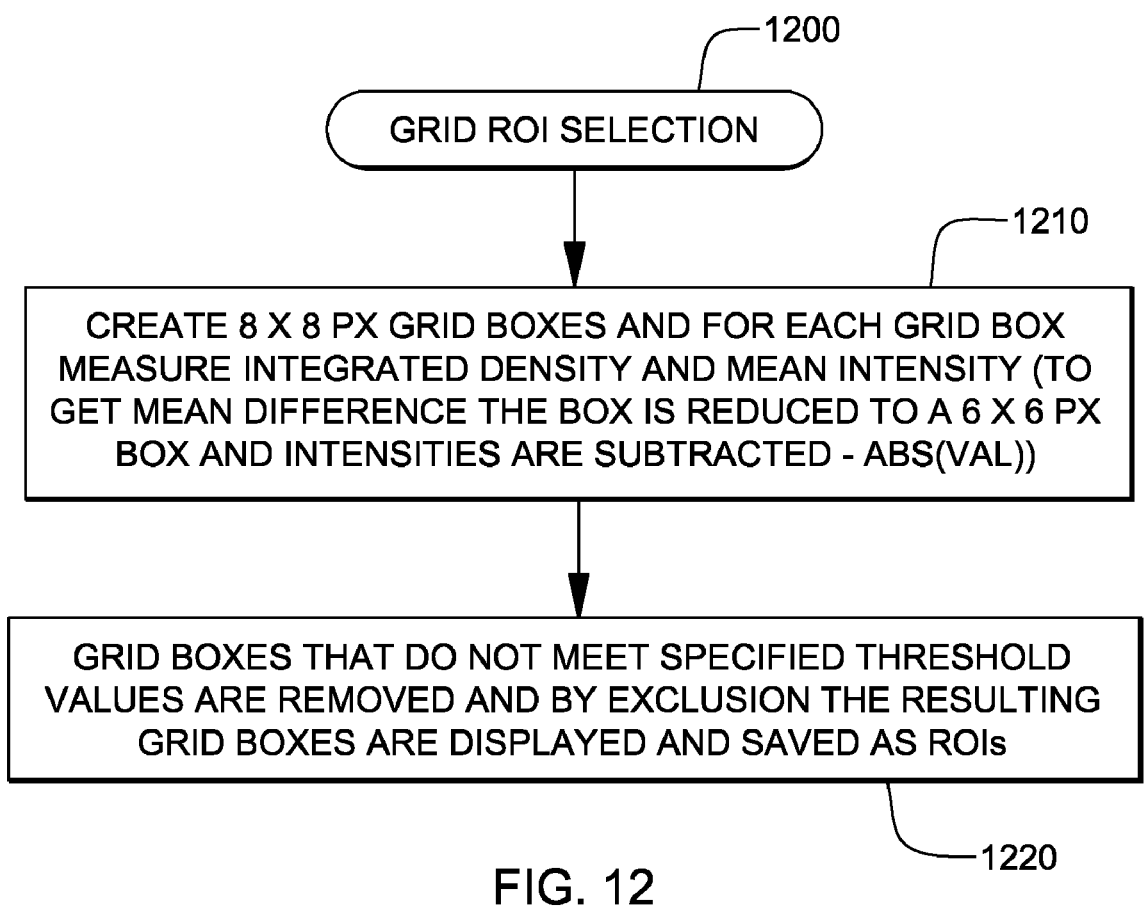
FIG. 12 is a flowchart of an alternate embodiment of a process for selecting regions of interest of a digital image, in accordance with one or more aspects of the present invention.

FIG. 12 depicts an alternate process for ROI selection, referred to as grid ROI selection 1200. The same three criteria as used in the ROI selection of FIGS. 7A & 7B are employed in this process, that is, the mean difference in intensity between, for example, an 8×8 pixel box and a 6×6 pixel box, the integrated density of pixels within the 8×8 pixel box and the mean intensity of pixels within the 8×8 pixel box. The process begins by creating pixel grid boxes abutting across the image. For each grid box, integrated density and mean intensity are measured, and the mean intensity difference is calculated 1210, as described above in connection with FIG. 7A. Those grid boxes that do not meet the specified threshold values are removed, and by exclusion, the resulting grid boxes are displayed and saved as ROIs 1220.

Figure 13:
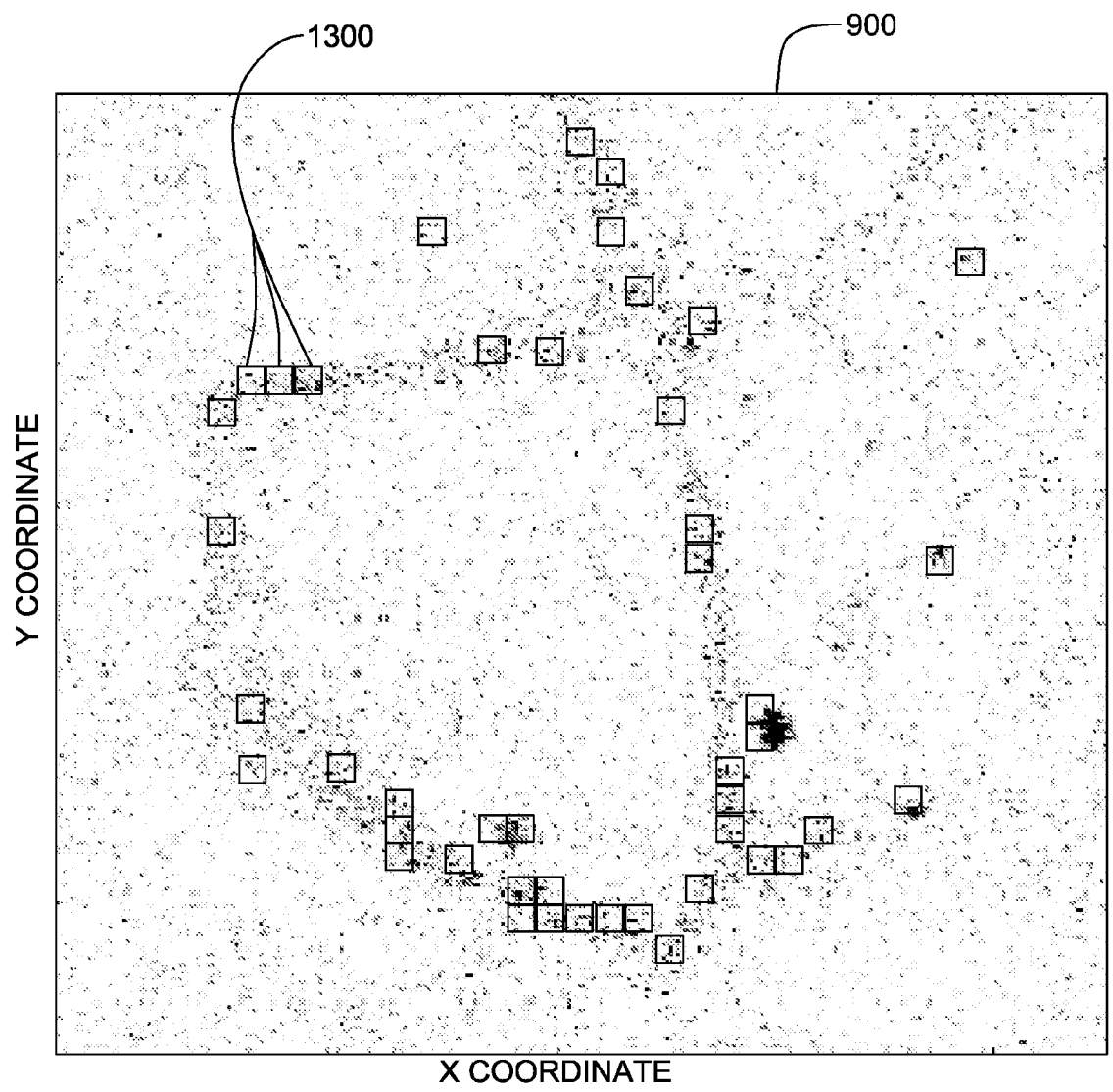
FIG. 13 depicts the image of FIG. 9, with regions of interest illustrated having been selected using the grid-based region of interest selection process of FIG. 12, in accordance with one or more aspects of the present invention.

FIG. 13 illustrates one embodiment of image 900 having ROIs 1300 selected by this grid ROI selection process. Although this process is faster and ensures no ROI overlap, integrity of each ROI is compromised compared with the process described above in connection with FIGS. 3, 7A & 7B. This is because there is no running one pixel box selection as an overlapping criteria as described above in connection with FIG. 7A, and measurements are taken at 8-pixel intervals, while the overlapping process described above takes measurements at 3-pixel x-coordinate intervals and 4-pixel y-coordinate intervals as each row is processed.

Figure 14:
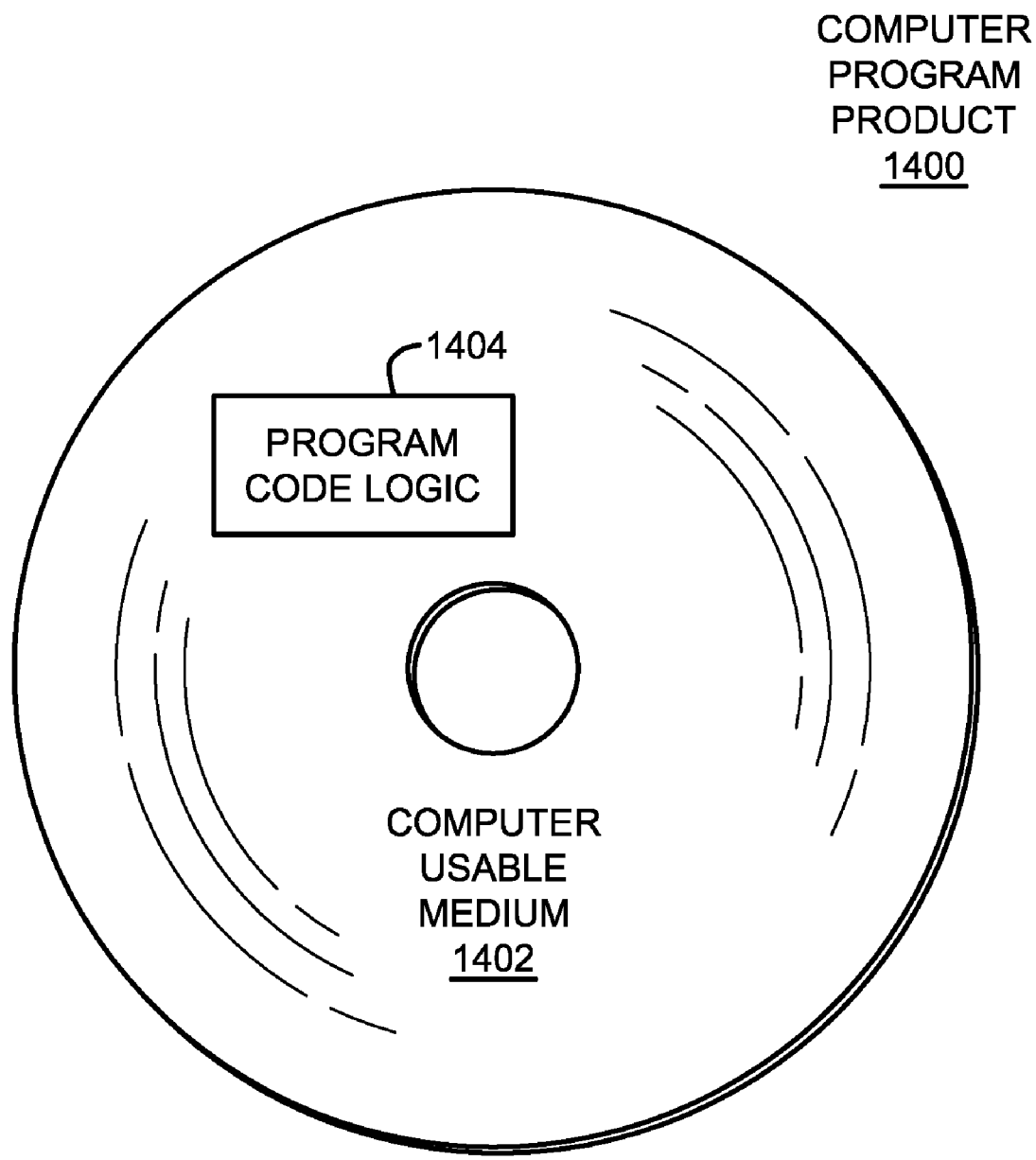
FIG. 14 depicts one example of a computer program product incorporating one or more aspects of the present invention.

One example of an article of manufacture or a computer program product incorporating one or more aspects of the present invention is described with reference to FIG. 14. A computer program product 1400 includes, for instance, one or more computer usable media 1402 to store computer readable program code means or logic 1404 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Advantageously, presented herein is an image processing facility automating the processing and data analysis of images, such as FRET images in order to identify clustered protein interactions (as an example). Images are collected using any standard input device, such as a confocal microscope, and converted for use by the digital image processing described herein above. The processing facility presented may be installed locally on, for example, one or more laboratory computers, and work with any operating system. The image processing facility presented removes bias and labor-intensive manual data processing from FRET image analysis, and also allows FRET-based, high-throughput screening using quantitative methods. Images are corrected using the precision FRET correction algorithm referenced above, and data is presented according to the PFRET clustering assay. As one example, the image processing presented herein may be employed for any fluorophore clustering interaction analysis, such as the LDL clustering assay.

The image processing presented herein allows the separation of regions of interest from background of the image, with coordinates for identified regions of interest being saved or output, and identified regions of interest displayed, for example, on a PFRET image. The processing presented herein is capable of automating the handling of images, such as FRET multi-channel image data. The disclosed image processing is capable of performing data analysis on bulk FRET images and outputting data useful for an FRET clustering assay being run. In one implementation, images are identified as corresponding to an appropriate channel. Processing then automatically subtracts calculated image background, uses the precision FRET algorithm to remove donor and acceptor image bleed-through, automatically selects regions of interest as outlined above, and automatically from the resultant image, collects E % and fluorescent data and saves the data, for example, as a text file, in an appropriate location.

Presented herein is a processing approach for integrating all aspects of doing quantitative FRET analysis of raw images from confocal microscopy of different channels. The handling of multiple image channels of different fluoresce frequencies upon which quantitative FRET is automatically calculated and images are batch-processed using the precision FRET algorithm is disclosed. As noted, sample processing steps include automated background subtraction, bleed-through correction, image ROI selection, and efficiency calculation and data generation.

In addition, although characterized initially as computer-implemented image processing methods in the claims presented herewith, the above-described aspects of the invention further comprise image processing apparatuses and articles of manufacture as set forth below.

For example, in one aspect, an image processing apparatus is provided which includes: at least one computer to obtain an image represented by an array of pixel intensity values and to process the image for identifying one or more regions of interest therein, wherein the processing includes: employing a first pixel box in progressively scanning and evaluating the image for areas of interest, wherein the first pixel box is sized as a first two-dimensional coordinate sub-array of pixels; selecting one or more areas of interest of the image employing the first pixel box, the selecting comprising identifying an area of interest within the image if at least one pixel-intensity-related characteristic of pixels within the first pixel box at a particular location of the image exceeds a first defined threshold; employing a second pixel box in progressively scanning and evaluating selected areas of interest of the image for one or more regions of interest, wherein each area of interest is larger than a region of interest, the second pixel box is sized as a second two-dimensional coordinate sub-array of pixels, and the second pixel box is smaller than the first pixel box; selecting one or more regions of interest of the image employing the second pixel box, the selecting including identifying a region of interest within the image if the at least one pixel-intensity-related characteristic of pixels within the second pixel box at a particular location of an area of interest exceeds a second defined threshold, wherein the second defined threshold is greater than the first defined threshold; and performing at least one of storing or outputting location identifying information for selected regions of interest of the image.

Additionally, numerous enhancements to the above-described apparatus are also presented. These enhancements include the at least one pixel-intensity-related characteristic further comprising at least one of a maximum pixel intensity or a mean pixel intensity of pixels within the first pixel box or the second pixel box. Further, the selecting one or more areas of interest may comprise identifying an area of interest within the image if multiple pixel-intensity-related characteristics of pixels within the first pixel box at a particular location of the image exceed respective defined thresholds, wherein the multiple pixel-intensity-related characteristics comprise a maximum pixel intensity of pixels within the first pixel box and a mean pixel intensity of pixels within the first pixel box.

Further enhanced features of the image apparatus as described above include an apparatus wherein employing the first pixel box in progressively scanning and evaluating the image includes progressively moving the first pixel box across the image in the x-coordinate direction and the y-coordinate direction to evaluate the pixels representing the image, and wherein employing the second pixel box in progressively scanning and evaluating selected areas of interest further comprises for each selected area of interest progressively moving the second pixel box across the selected area of interest to identify one or more regions of interest therein. Additionally, in this enhanced apparatus, the first pixel box may be a 32×32 pixel box, and wherein the first pixel box may be moved 32 pixels at a time in one of the x-coordinate direction or y-coordinate direction in progressively scanning and evaluating the image for areas of interest, and wherein the second pixel box may be an 8×8 pixel box which is progressively moved within an area of interest of the image, wherein each area of interest of the image is a 32×32 pixel area of the image and the second pixel box is progressively moved in the x-coordinate direction or the y-coordinate direction to evaluate the pixels of the area of interest.

As another enhancement, the employing the second pixel box in progressively scanning and evaluating selected areas of interest may further comprise employing a third pixel box in evaluating areas of interest of the image for regions of interest, the third pixel box being sized as a third two-dimensional coordinate sub-array of pixels, wherein the third pixel box is smaller than the second pixel box and shares a common center with the second pixel box, and wherein selecting one or more regions of interest of the image may further comprise selecting pixels within the second pixel box at a particular location of an area of interest as a region of interest if a difference between the at least one pixel-intensity-related characteristic of the second pixel box and the at least one pixel-intensity-related characteristic of the third pixel box exceeds a defined threshold. Additionally, the at least one pixel-intensity-related characteristic may comprise a mean pixel intensity of pixels, and the second pixel box may be selected as a region of interest if the difference between the mean pixel intensity of pixels within the second pixel box (at a particular location of an area of interest) and the mean pixel intensity of pixels within the third pixel box is greater than a defined threshold. As one example, the second pixel box is an 8×8 pixel box and the third pixel box is a 6×6 pixel box.

As a further enhancement, the selecting one or more regions of interest of the image employing the second pixel box may further comprise identifying a region of interest within the image if multiple pixel-intensity-related characteristics of pixels within the second pixel box at a particular location of the area of interest exceed respective defined thresholds, the multiple pixel-intensity-related characteristics comprising an integrated density of pixels within the second pixel box. Also, the selecting one or more regions of interest within the image employing the second pixel box may comprise identifying a region of interest of the image if pixels within multiple second pixel box locations offset by one pixel in the x-coordinate direction or one pixel in the y-coordinate direction exceed the respective defined thresholds. Further, the multiple pixel-intensity-related characteristics may comprise a maximum pixel intensity of pixels within the second pixel box and a mean intensity difference between the second pixel box and third pixel box, and wherein the mean intensity difference is a difference between the mean intensity of pixels within the second pixel box and the mean intensity of pixels within the third pixel box. The selecting one or more regions of interest within the image employing the second pixel box may comprise identifying a region of interest of the image if pixels within three consecutive second pixel box locations offset by one pixel in the x-coordinate direction or one pixel in the y-coordinate direction exceed their respective defined thresholds. As an example, the second pixel box is a 8×8 pixel box, and the identified region of interest of the image is a 10×10 pixel box.

As another enhancement, the at least one computer may be further adapted to, subsequent to selecting regions of interest of the image employing the second pixel box, remove overlapping regions of interest, wherein the removing of overlapping regions of interest further includes selecting from a group of overlapping regions of interest, a region of interest having a highest multiple of (integrated pixel density)×(mean pixel intensity)×(mean intensity difference), wherein integrated pixel density is the integrated density of pixels within the respective region of interest, mean pixel intensity is the mean intensity of pixels within the respective region of interest, and mean intensity difference is the difference in mean intensities between pixels of the second pixel box and pixels of a third pixel box employed in selecting the region of interest, wherein the third pixel box is sized as a third two-dimensional coordinate sub-array of pixels which is smaller than the second pixel box and shares a common center with the second pixel box.

As one example, the image is one of a fluorescence resonance energy transfer image or an image derived from a fluorescence resonance energy transfer image, and the at least one computer implements an automated method for processing multiple images represented by respective arrays of pixel intensity values to identify regions of interest therein, the multiple images being multiple punctate images with different morphologies.

In another aspect, an image processing apparatus is provided which includes at least one computer to obtain an image represented by an array of pixel intensity values and to process the image for regions of interest, wherein processing the image includes: (i) employing a first pixel box in evaluating the image, the employing including determining for pixels within the first pixel box a pixel-intensity-related characteristic, wherein the first pixel box is sized as a first two-dimensional coordinate sub-array of pixels; (ii) determining for pixels within a second pixel box the pixel-intensity-related characteristic, wherein the second pixel box is sized as a second two-dimensional coordinate sub-array of pixels, and wherein the second pixel box is smaller than the first pixel box and shares a common center with the first pixel box; (iii) selecting pixels within the first pixel box as a region of interest of the image if a difference between the pixel-intensity-related characteristic of the first pixel box and the pixel-intensity-related characteristic of the second pixel box exceeds a defined threshold; and performing at least one of saving or outputting location identifying information for the selected regions of interest of the image.

Enhancements on this apparatus include repeating the evaluating by progressively moving the first pixel box, and therefore the second pixel box, through the array of pixels representing the image, and that the selecting of pixels within the first pixel box as a region of interest may further comprise identifying a region of interest if pixels within multiple first pixel box locations offset by one pixel in the x-coordinate direction or one pixel in the y-coordinate direction exceed the defined threshold for the difference between the pixel-intensity-related characteristic of the first pixel box and the pixel-intensity-related characteristic of the second pixel box.

As a further enhancement, the selecting may comprise identifying a region of interest if pixels within each of multiple first pixel box locations offset by one pixel in the x-coordinate direction or one pixel in the y-coordinate direction comprise multiple pixel-intensity-related characteristics which exceed respective defined thresholds, the multiple pixel-intensity-related characteristics comprising a mean intensity difference, which is a difference in mean intensities between pixels in the first pixel box at a particular location and the respective second pixel box, a maximum pixel intensity, and an integrated density of pixels within the first pixel box. Further, the region of interest may be identified if pixels within three first pixel box locations offset by one pixel in the x-coordinate direction or one pixel in the y-coordinate direction respectively, comprise a mean intensity difference, maximum pixel intensity and integrated density exceeding their respective defined thresholds. Additionally, the at least one computer of the apparatus may be adapted to divide the image into a grid of a plurality of adjoining first pixel boxes and perform the evaluating within each first pixel box of the grid to identify regions of interest within the image.

In a further aspect, an image processing apparatus is provided which includes at least one computer to obtain an image represented by an array of pixel intensity values, the image including multiple identified regions of interest, wherein at least two regions of interest of the multiple regions of interest within the image overlap, and wherein the at least one computer selects a region of interest of the at least two regions of interest overlapping within the image. The selecting including: selecting the region of interest of the at least two regions of interest having a highest multiple of at least two pixel-intensity-related characteristics of pixels within respective regions of interest of the at least two overlapping regions of interest of the image; and performing at least one of saving or outputting location identifying information for the selected region of interest having the highest multiple of the at least two pixel-intensity-related characteristics.

Enhancements to this image processing apparatus include selecting the region of interest from the at least two regions of interest overlapping by determining a mean intensity difference for each region of interest of the at least two regions of interest, wherein determining the mean intensity difference comprises: (i) determining for pixels within a first pixel box a mean intensity, wherein the first pixel box is a first two-dimensional coordinate sub-array of pixels sized to the region of interest; (ii) determining for pixels within a second pixel box the mean pixel intensity, wherein the second pixel box is sized as a second two-dimensional coordinate sub-array of pixels, and wherein the second pixel box is smaller than the first pixel box and shares a common center with the first pixel box; and (iii) determining a difference between the mean pixel intensity of the first pixel box and the mean pixel intensity of the second pixel box, wherein the mean pixel intensity difference is one pixel-intensity-related characteristic of the at least two pixel-intensity-related characteristics. Additionally, selecting the region of interest from the at least two overlapping regions of interest may include selecting the region of interest having the highest multiple of (integrated density)×(mean intensity)×(mean intensity difference) for the pixels thereof, wherein integrated pixel density is the integrated density of pixels within the respective region of interest, mean pixel intensity is the mean intensity of pixels within the respective region of interest, and mean intensity difference is the difference in mean intensities between pixels of the first pixel box and pixels of the second pixel box employed in identifying the respective region of interest.

In a further aspect, an article of manufacture is presented herein which includes at least one computer-usable medium having computer-readable program code logic to process an image, the computer-readable program code logic when executing performing the following: obtaining an image represented by an array of pixel intensity values; employing a first pixel box in progressively scanning and evaluating the image for areas of interest, wherein the first pixel box is sized as a first two-dimensional coordinate sub-array of pixels; selecting one or more areas of interest of the image employing the first pixel box, the selecting comprising identifying an area of interest within the image if at least one pixel-intensity-related characteristic of pixels within the first pixel box at a particular location of the image exceeds a first defined threshold; employing a second pixel box in progressively scanning and evaluating selected areas of interest of the image for one or more regions of interest, wherein each area of interest is larger than a region of interest, the second pixel box is sized as a second two-dimensional coordinate sub-array of pixels, and the second pixel box is smaller than the first pixel box; selecting one or more regions of interest of the image employing the second pixel box, the selecting including identifying a region of interest within the image if the at least one pixel-intensity-related characteristic of pixels within the second pixel box at a particular location of an area of interest exceeds a second defined threshold, wherein the second defined threshold is greater than the first defined threshold; and performing at least one of storing or outputting location identifying information for selected regions of interest of the image.

Enhancements to the above-noted article of manufacture include: the at least one pixel-intensity-related characteristic comprising at least one of a maximum pixel intensity or a mean pixel intensity of pixels within the first pixel box or the second pixel box, and/or the selecting one or more areas of interest comprising identifying an area of interest within the image if multiple pixel-intensity-related characteristics of pixels within the first pixel box at a particular location of the image exceed respective defined thresholds, wherein the multiple pixel-intensity-related characteristics comprise a maximum pixel intensity of pixels within the first pixel box and a mean pixel intensity of pixels within the first pixel box.

Further enhanced features of the article of manufacture include employing the first pixel box in progressively scanning and evaluating the image by progressively moving the first pixel box across the image in the x-coordinate direction and the y-coordinate direction to evaluate the pixels representing the image, and wherein employing the second pixel box in progressively scanning and evaluating selected areas of interest further comprises for each selected area of interest progressively moving the second pixel box across the selected area of interest to identify one or more regions of interest therein. Additionally, this article of manufacture may include a first pixel box which is a 32×32 pixel box, with the first pixel box being moved 32 pixels at a time in one of the x-coordinate direction or y-coordinate direction in progressively scanning and evaluating the image for areas of interest, and wherein the second pixel box is an 8×8 pixel box which is progressively moved within an area of interest of the image, wherein each area of interest of the image is a 32×32 pixel area of the image and the second pixel box is progressively moved in the x-coordinate direction or the y-coordinate direction to evaluate the pixels of the area of interest.

As an additional enhancement, the employing the second pixel box in progressively scanning and evaluating selected areas of interest may further comprise employing a third pixel box in evaluating areas of interest of the image for regions of interest, the third pixel box being sized as a third two-dimensional coordinate sub-array of pixels, wherein the third pixel box is smaller than the second pixel box and shares a common center with the second pixel box, and wherein selecting one or more regions of interest of the image further comprises selecting pixels within the second pixel box at a particular location of an area of interest as a region of interest if a difference between the at least one pixel-intensity-related characteristic of the second pixel box and the at least one pixel-intensity-related characteristic of the third pixel box exceeds a defined threshold. Further, the at least one pixel-intensity-related characteristic may comprise a mean pixel intensity of pixels, and the second pixel box may be selected as a region of interest if the difference between the mean pixel intensity of pixels within the second pixel box (at a particular location of an area of interest) and the mean pixel intensity of pixels within the third pixel box is greater than a defined threshold. As one example, the second pixel box is an 8×8 pixel box and the third pixel box is a 6×6 pixel box.

In additional enhancements, the selecting one or more regions of interest of the image employing the second pixel box may comprise identifying a region of interest within the image if multiple pixel-intensity-related characteristics of pixels within the second pixel box at a particular location of the area of interest exceed respective defined thresholds, the multiple pixel-intensity-related characteristics comprising an integrated density of pixels within the second pixel box. Further, the selecting one or more regions of interest within the image employing the second pixel box may comprise identifying a region of interest of the image if pixels within multiple second pixel box locations offset by one pixel in the x-coordinate direction or one pixel in the y-coordinate direction exceed the respective defined thresholds. The multiple pixel-intensity-related characteristics may further comprise a maximum pixel intensity of pixels within the second pixel box and a mean intensity difference between the second pixel box and third pixel box, wherein the mean intensity difference is a difference between the mean intensity of pixels within the second pixel box and the mean intensity of pixels within the third pixel box. Additionally, selecting one or more regions of interest within the image employing the second pixel box may comprise identifying a region of interest of the image if pixels within three consecutive second pixel box locations offset by one pixel in the x-coordinate direction or one pixel in the y-coordinate direction exceed their respective defined thresholds. As a specific example, the second pixel box is a 8×8 pixel box, and the identified region of interest of the image is a 10×10 pixel box.

Further enhancements include, subsequent to selecting regions of interest of the image employing the second pixel box, removing overlapping regions of interest, removing overlapping regions of interest by selecting from a group of overlapping regions of interest, a region of interest having a highest multiple of (integrated pixel density)×(mean pixel intensity)×(mean intensity difference), wherein integrated pixel density is the integrated density of pixels within the respective region of interest, mean pixel intensity is the mean intensity of pixels within the respective region of interest, and mean intensity difference is the difference in mean intensities between pixels of the second pixel box and pixels of a third pixel box employed in selecting the region of interest, wherein the third pixel box is sized as a third two-dimensional coordinate sub-array of pixels which is smaller than the second pixel box and shares a common center with the second pixel box.

Additionally, the image may be one of a fluorescence resonance energy transfer image or an image derived from a fluorescence resonance energy transfer image, and/or the article of manufacture may comprise an automated method for processing multiple images represented by respective arrays of pixel intensity values to identify regions of interest therein, the multiple images being multiple punctate images with different morphologies.

In an additional aspect, an article of manufacture is provided which includes at least one computer-usable medium having computer-readable program code logic to process an image, the computer-readable program code logic when executing performing the following: obtaining an image represented by an array of pixel intensity values; evaluating the image for regions of interest, wherein the evaluating includes: (i) employing a first pixel box in evaluating the image, the employing including determining for pixels within the first pixel box a pixel-intensity-related characteristic, wherein the first pixel box is sized as a first two-dimensional coordinate sub-array of pixels; (ii) determining for pixels within a second pixel box the pixel-intensity-related characteristic, wherein the second pixel box is sized as a second two-dimensional coordinate sub-array of pixels, and wherein the second pixel box is smaller than the first pixel box and shares a common center with the first pixel box; (iii) selecting pixels within the first pixel box as a region of interest of the image if a difference between the pixel-intensity-related characteristic of the first pixel box and the pixel-intensity-related characteristic of the second pixel box exceeds a defined threshold; and performing at least one of saving or outputting location identifying information for the selected regions of interest of the image.

Enhancements to this article of manufacture include: repeating the evaluating by progressively moving the first pixel box, and therefore the second pixel box, through the array of pixels representing the image, and selecting of pixels within the first pixel box as a region of interest by identifying a region of interest if pixels within multiple first pixel box locations offset by one pixel in the x-coordinate direction or one pixel in the y-coordinate direction exceed the defined threshold for the difference between the pixel-intensity-related characteristic of the first pixel box and the pixel-intensity-related characteristic of the second pixel box. As another enhancement, the selecting may comprise identifying a region of interest if pixels within each of multiple first pixel box locations offset by one pixel in the x-coordinate direction or one pixel in the y-coordinate direction comprise multiple pixel-intensity-related characteristics which exceed respective defined thresholds, the multiple pixel-intensity-related characteristics comprising a mean intensity difference, which is a difference in mean intensities between pixels in the first pixel box at a particular location and the respective second pixel box, a maximum pixel intensity, and an integrated density of pixels within the first pixel box. In one implementation, the region of interest is identified if pixels within three first pixel box locations offset by one pixel in the x-coordinate direction or one pixel in the y-coordinate direction respectively comprise a mean intensity difference, maximum pixel intensity and integrated density exceeding their respective defined thresholds. Additionally, the computer program code logic when executing may divide the image into a grid of a plurality of adjoining first pixel boxes and perform the evaluating within each first pixel box of the grid to identify regions of interest within the image.

In a further aspect, an article of manufacture is provided which includes: at least one computer-usable medium having computer-readable program code logic to process an image, the computer-readable program code logic when executing performing the following: obtaining an image represented by an array of pixel intensity values and comprising multiple identified regions of interest within the image, wherein at least two regions of interest of the multiple identified regions of interest within the image overlap; and selecting one region of interest of the at least two regions of interest overlapping within the image, the selecting including: selecting the region of interest of the at least two regions of interest having a highest multiple of at least two pixel-intensity-related characteristics of pixels within respective regions of interest of the at least two overlapping regions of interest of the image; and performing at least one of saving or outputting location identifying information for the selected region of interest having the highest multiple of the at least two pixel-intensity-related characteristics.

An enhancement to this article of manufacture includes: selecting the region of interest from the at least two regions of interest overlapping by determining a mean intensity difference for each region of interest of the at least two regions of interest, wherein determining the mean intensity difference comprises: (i) determining for pixels within a first pixel box a mean intensity, wherein the first pixel box is a first two-dimensional coordinate sub-array of pixels sized to the region of interest; (ii) determining for pixels within a second pixel box the mean pixel intensity, wherein the second pixel box is sized as a second two-dimensional coordinate sub-array of pixels, and wherein the second pixel box is smaller than the first pixel box and shares a common center with the first pixel box; and (iii) determining a difference between the mean pixel intensity of the first pixel box and the mean pixel intensity of the second pixel box, wherein the mean pixel intensity difference is one pixel-intensity-related characteristic of the at least two pixel-intensity-related characteristics. Additionally, selecting the region of interest from the at least two overlapping regions of interest may further comprise selecting the region of interest having the highest multiple of (integrated density)×(mean intensity)×(mean intensity difference) for the pixels thereof, wherein integrated pixel density is the integrated density of pixels within the respective region of interest, mean pixel intensity is the mean intensity of pixels within the respective region of interest, and mean intensity difference is the difference in mean intensities between pixels of the first pixel box and pixels of the second pixel box employed in identifying the respective region of interest.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented image processing method comprising:
    obtaining an image represented by an array of pixel intensity values;
    employing a first pixel box in progressively scanning and evaluating the image for areas of interest, wherein the first pixel box is sized as a first two-dimensional coordinate sub-array of pixels;
    selecting one or more areas of interest of the image employing the first pixel box, the selecting comprising identifying an area of interest within the image if at least one pixel-intensity-related characteristic of pixels within the first pixel box at a particular location of the image exceeds a first defined threshold;
    employing a second pixel box in progressively scanning and evaluating selected areas of interest of the image for one or more regions of interest, wherein each area of interest is larger than a region of interest and the second pixel box is sized as a second two-dimensional coordinate sub-array of pixels, and wherein the second pixel box is smaller than the first pixel box;
    selecting one or more regions of interest of the image employing the second pixel box, the selecting comprising identifying a region of interest within the image if the at least one pixel-intensity-related characteristic of pixels within the second pixel box at a particular location of an area of interest exceeds a second defined threshold, wherein the second defined threshold is greater than the first defined threshold;
    performing at least one of storing or outputting location identifying information for selected regions of interest of the image;
    wherein employing the second pixel box in progressively scanning and evaluating selected areas of interest further comprises employing a third pixel box in evaluating areas of interest of the image for regions of interest, the third pixel box being sized as a third two-dimensional coordinate sub-array of pixels, wherein the third pixel box is smaller than the second pixel box and shares a common center with the second pixel box, and wherein selecting one or more regions of interest of the image further comprises selecting pixels within the second pixel box at a particular location of an area of interest as a region of interest if a difference between the at least one pixel-intensity-related characteristic of the second pixel box and the at least one pixel-intensity-related characteristic of the third pixel box exceeds a defined threshold; and
    wherein the at least one pixel-intensity-related characteristic comprises a mean pixel intensity of pixels, and wherein the second pixel box is selected as a region of interest if the difference between the mean pixel intensity of pixels within the second pixel box at a particular location of an area of interest and the mean pixel intensity of pixels within the third pixel box is greater than a respective defined threshold.

2. The method of claim 1, wherein the second pixel box is an 8×8 pixel box and the third pixel box is a 6×6 pixel box.

3. A computer-implemented image processing method comprising;
    obtaining an image represented by an array of pixel intensity values;
    employing a first pixel box in progressively scanning and evaluating the image for areas of interest, wherein the first pixel box is sized as a first two-dimensional coordinate sub-array of pixels;
    selecting one or more areas of interest of the image employing the first pixel box, the selecting comprising identifying an area of interest within the image if at least one pixel-intensity-related characteristic of pixels within the first pixel box at a particular location of the image exceeds a first defined threshold;
    employing a second pixel box in progressively scanning and evaluating selected areas of interest of the image for one or more regions of interest, wherein each area of interest is larger than a region of interest and the second pixel box is sized as a second two-dimensional coordinate sub-array of pixels, and wherein the second pixel box is smaller than the first pixel box;
    selecting one or more regions of interest of the image employing the second pixel box, the selecting comprising identifying a region of interest within the image if the at least one pixel-intensity-related characteristic of pixels within the second pixel box at a particular location of an area of interest exceeds a second defined threshold, wherein the second defined threshold is greater than the first defined threshold;
    performing at least one of storing or outputting location identifyring information for selected regions of interest of the image;
    wherein selecting one or more regions of interest of the image employing the second pixel box further comprises identifying a region of interest within the image if multiple pixel-intensity-related characteristics of pixels within the second pixel box at a particular location of the area of interest exceed respective defined thresholds, the multiple pixel-intensity-related characteristics comprising an integrated density of pixels within the second pixel box;

wherein selecting one or more regions of interest within the image employing the second pixel box further comprises identifying a region of interest of the image if pixels within multiple second pixel box locations offset by one pixel in the x-coordinate direction or one pixel in the y-coordinate direction exceed the respective defined thresholds; and wherein the multiple pixel-intensity-related characteristics further comprise a maximum pixel intensity of pixels within the second pixel box and a mean intensity difference between the second pixel box and a third pixel box, and wherein the mean intensity difference is a difference between the mean intensity of pixels within the second pixel box and the mean intensity of pixels within the third pixel box.

4. A computer-implemented image processing method comprising:

obtaining an image represented by an array of pixel intensity values;

employing a first pixel box in progressively scanning and evaluating the image for areas of interest, wherein the first pixel box is sized as a first two-dimensional coordinate sub-array of pixels;

selecting one or more areas of interest of the image employing the first pixel box, the selecting comprising identifying an area of interest within the image if at least one pixel-intensity-related characteristic of pixels within the first pixel box at a particular location of the image exceeds a first defined threshold;

employing a second pixel box in progressively scanning and evaluating selected areas of interest of the image for one or more regions of interest, wherein each area of interest is larger than a region of interest and the second pixel box is sized as a second two-dimensional coordinate sub-array of pixels, and wherein the second pixel box is smaller than the first pixel box;

selecting one or more regions of interest of the image employing the second pixel box, the selecting comprising identifying a region of interest within the image if the at least one pixel-intensity-related characteristic of pixels within the second pixel box at a particular location of an area of interest exceeds a second defined threshold, wherein the second defined threshold is greater than the first defined threshold;

performing at least one of storing or outputting location identifying information for selected regions of interest of the image; and further comprising subsequent to selecting regions of interest of the image employing the second pixel box, removing overlapping regions of interest, wherein the removing of overlapping regions of interest further includes selecting from a group of overlapping regions of interest, a region of interest having a highest multiple of (integrated pixel density)×(mean pixel intensity)×(mean intensity difference), wherein integrated pixel density is the integrated density of pixels within the respective region of interest, mean pixel intensity is the mean intensity of pixels within the respective region of interest, and mean intensity difference is the difference in mean intensities between pixels of the second pixel box and pixels of a third pixel box employed in selecting the region of interest, wherein the third pixel box is sized as a third two-dimensional coordinate sub-array of pixels which is smaller than the second pixel box and shares a common center with the second pixel box.

5. A computer-implemented image processing method comprising:

obtaining an image represented by an array of pixel intensity values; and evaluating the image for regions of interest, wherein the evaluating includes:
(i) employing a first pixel box in evaluating the image, the employing including determining for pixels within the first pixel box a pixel-intensity-related characteristic, wherein the first pixel box is sized as a first two-dimensional coordinate sub-array of pixels;
(ii) determining for pixels within a second pixel box the pixel-intensity-related characteristic, wherein the second pixel box is sized as a second two-dimensional coordinate sub-array of pixels, and wherein the second pixel box is smaller than the first pixel box and shares a common center with the first pixel box;
(iii) selecting pixels within the first pixel box as a region of interest of the image if a difference between the pixel-intensity-related characteristic of the first pixel box and the pixel-intensity-related characteristic of the second pixel box exceeds a defined threshold; and performing at least one of saving or outputting location identifying information for the selected regions of interest of the image;

wherein the selecting further comprises identifying a region of interest if pixels within each of multiple first pixel box locations offset by one pixel in the x-coordinate direction or one pixel in the y-coordinate direction comprise multiple pixel-intensity-related characteristics which exceed respective defined thresholds, the multiple pixel-intensity-related characteristics comprising a mean intensity difference, which is a difference in mean intensities between pixels in the first pixel box at a particular location and the respective second pixel box, a maximum pixel intensity, and an integrated density of pixels within the first pixel box; and wherein the region of interest is identified if pixels within three first pixel box locations offset by one pixel in the x-coordinate direction or one pixel in the y-coordinate direction respectively comprise a mean intensity difference, maximum pixel intensity and integrated density exceeding their respective defined thresholds.

6. A computer-implemented image processing method comprising:

obtaining an image represented by an array of pixel intensity values and comprising multiple identified regions of interest within the image, wherein at least two regions of interest of the multiple regions of interest within the image overlap; and selecting one region of interest of the at least two regions of interest overlapping within the image, the selecting comprising:
selecting the region of interest of the at least two regions of interest having a highest multiple of at least two pixel-intensity-related characteristics of pixels within the respective regions of interest of the at least two overlapping regions of interest of the image; and
performing at least one of saving or outputting location identifying information for the selected region of interest having the highest multiple of the at least two pixel-intensity-related characteristics, wherein selecting the region of interest from the at least two regions of interest overlapping further comprises determining a mean intensity difference for each region of interest of the at least two regions of interest, wherein determining the mean intensity difference comprises:
(i) determining for pixels within a first pixel box a mean intensity, wherein the first pixel box is a first two-dimensional coordinate sub-array of pixels sized to the region of interest;
(ii) determining for pixels within a second pixel box the mean pixel intensity, wherein the second pixel box is sized as a second two-dimensional coordinate sub-array of pixels, and wherein the second pixel box is smaller than the first pixel box and shares a common center with the first pixel box; and
(iii) determining a difference between the mean pixel intensity of the first pixel box and the mean pixel intensity of the second pixel box, wherein the mean pixel intensity difference is one pixel-intensity-related characteristic of the at least two pixel-intensity-related characteristics.

7. The method of claim 6, wherein selecting the region of interest from the at least two overlapping regions of interest further comprises selecting the region of interest having the highest multiple of (integrated density)×(mean intensity)×(mean intensity difference) for the pixels thereof, wherein integrated pixel density is the integrated density of pixels within the respective region of interest, mean pixel intensity is the mean intensity of pixels within the respective region of interest, and mean intensity difference is the difference in mean intensities between pixels of the first pixel box and pixels of the second pixel box employed in identifying the respective region of interest.

* * * * *